(12) United States Patent　　(10) Patent No.: US 8,686,953 B2
MacDougall et al.　　(45) Date of Patent: Apr. 1, 2014

(54) ORIENTING A DISPLAYED ELEMENT RELATIVE TO A USER

(75) Inventors: Francis MacDougall, Ottawa (CA); Evan Hildreth, Ottawa (CA)

(73) Assignee: Qualcomm Incorporated, San Diego, CA (US)

( * ) Notice: Subject to any disclaimer, the term of this patent is extended or adjusted under 35 U.S.C. 154(b) by 430 days.

(21) Appl. No.: 12/559,225

(22) Filed: Sep. 14, 2009

(65) Prior Publication Data

US 2010/0066667 A1　Mar. 18, 2010

Related U.S. Application Data

(60) Provisional application No. 61/096,376, filed on Sep. 12, 2008.

(51) Int. Cl.
*G06F 3/041* (2006.01)
*G06F 3/048* (2013.01)
*G06F 3/01* (2006.01)

(52) U.S. Cl.
USPC ........................... 345/173; 715/702; 715/788

(58) Field of Classification Search
None
See application file for complete search history.

(56) References Cited

U.S. PATENT DOCUMENTS

| | | | |
|---|---|---|---|
| 6,348,928 B1 | 2/2002 | Jeong | |
| 6,567,101 B1 | 5/2003 | Thomas | |
| 6,982,728 B1 | 1/2006 | Nicolas et al. | |
| 7,184,911 B2 | 2/2007 | Wakai | |
| 7,535,481 B2 * | 5/2009 | Dehlin | 345/659 |
| 7,626,598 B2 | 12/2009 | Manchester | |
| 7,724,242 B2 * | 5/2010 | Hillis et al. | 345/173 |
| 7,724,296 B2 | 5/2010 | Lonn | |
| 8,031,212 B2 | 10/2011 | Nicolas et al. | |
| 8,036,917 B2 * | 10/2011 | Kariathungal et al. | 705/3 |
| 2002/0163537 A1 | 11/2002 | Vernier et al. | |

(Continued)

FOREIGN PATENT DOCUMENTS

| | | |
|---|---|---|
| CN | 1720555 A | 1/2006 |
| CN | 101460977 A | 6/2009 |
| EP | 1124175 A2 | 8/2001 |
| WO | 2004036292 A2 | 4/2004 |

OTHER PUBLICATIONS

Holman, David, Gazetop: Interaction Techniques for Gaze-Aware Tabletops, CHI 2007 Doctoral Consortium, Apr. 28-May 3, 2007—San Jose, CA, pp. 1657-1660.*

(Continued)

*Primary Examiner* — Daniell L Negron
(74) *Attorney, Agent, or Firm* — Kilpatrick Townsend & Stockton LLP

(57) ABSTRACT

An element is initially displayed on an interactive touch-screen display device with an initial orientation relative to the interactive touch-screen display device. One or more images of a user of the interactive touch-screen display device are captured. The user is determined to be interacting with the element displayed on the interactive touch-screen display device. In addition, an orientation of the user relative to the interactive touch-screen display device is determined based on at least one captured image of the user of the interactive touch-screen display device. Thereafter, in response to determining that the user is interacting with the displayed element, the initial orientation of the displayed element relative to the interactive touch-screen display device is automatically adjusted based on the determined orientation of the user relative to the interactive touch-screen display device.

20 Claims, 16 Drawing Sheets

(56) References Cited

U.S. PATENT DOCUMENTS

| | | |
|---|---|---|
| 2004/0201595 A1 | 10/2004 | Manchester |
| 2005/0104848 A1 | 5/2005 | Yamaguchi et al. |
| 2005/0253807 A1 | 11/2005 | Hohmann et al. |
| 2005/0285845 A1 | 12/2005 | Dehlin |
| 2007/0040907 A1 | 2/2007 | Kern et al. |
| 2007/0064004 A1 | 3/2007 | Bonner et al. |
| 2007/0078552 A1* | 4/2007 | Rosenberg .................... 700/94 |
| 2007/0201725 A1 | 8/2007 | Steinberg et al. |
| 2007/0220444 A1 | 9/2007 | Sunday et al. |
| 2008/0239131 A1 | 10/2008 | Thorn |
| 2009/0060346 A1 | 3/2009 | Guerzhoy et al. |
| 2009/0313584 A1 | 12/2009 | Kerr et al. |
| 2010/0066763 A1 | 3/2010 | MacDougall et al. |
| 2010/0125816 A1 | 5/2010 | Bezos |

OTHER PUBLICATIONS

International Search Report & Written Opinion issued in International Application No. PCT/US2009/056827, mailed Nov. 6, 2009, 16 pages.

International Search Report & Written Opinion issued in International Application No. PCT/US2009/056825, mailed Oct. 26, 2009, 8 pages.

\* cited by examiner

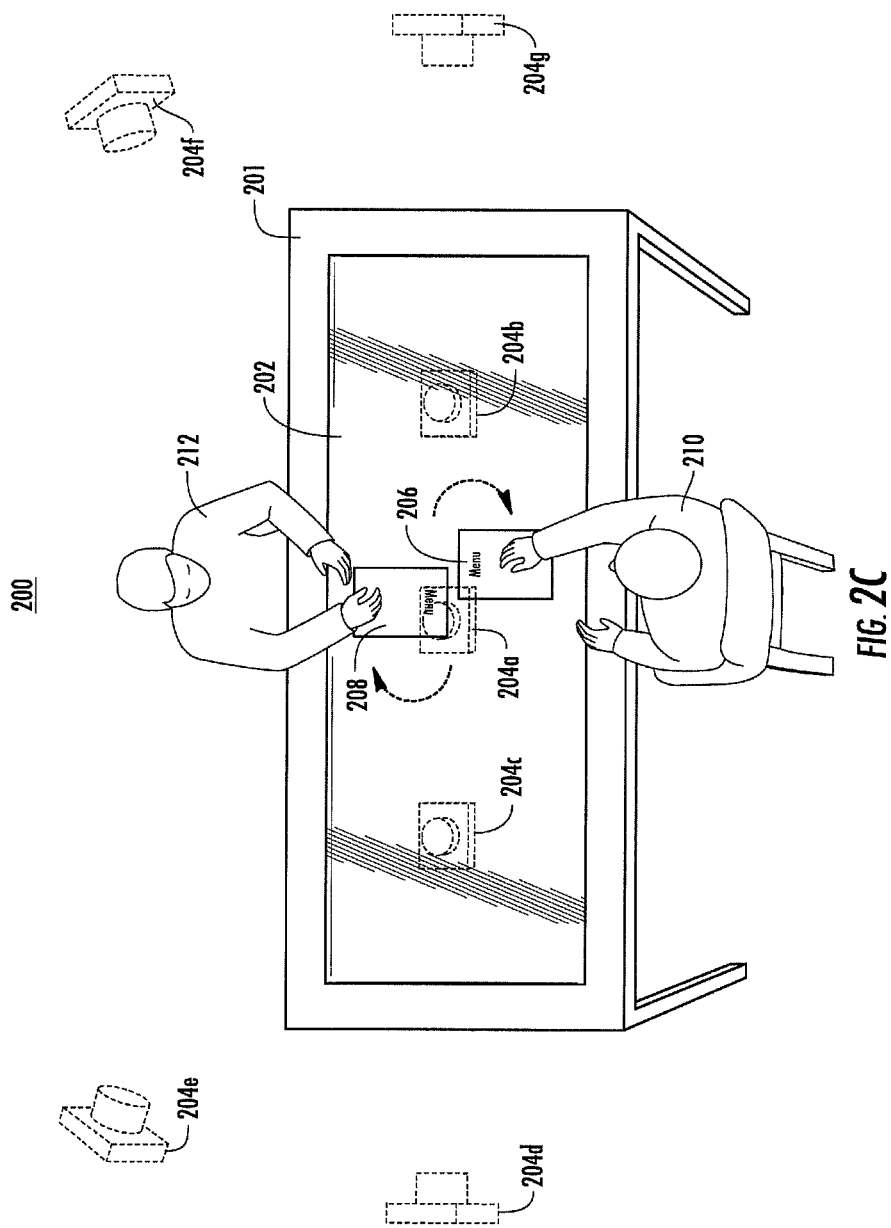

ORIENTING A DISPLAYED ELEMENT RELATIVE TO A USER

CROSS-REFERENCE TO RELATED APPLICATIONS

This application claims the benefit of U.S. Provisional Application No. 61/096,376, filed Sep. 12, 2008, which is incorporated by reference.

TECHNICAL FIELD

This disclosure relates to orienting an element on a touch-screen display relative to a user.

BACKGROUND

A touch-screen display generally enables a user to interact with and control displayed content by touching or otherwise motioning in the vicinity of the content displayed on the touch-screen display. Some touch-screen displays require that a user, or some other tangible object (e.g., a stylus), physically touch a surface of the touch-screen display in order to interact with and control displayed content. Other touch-screen displays enable a user to interact with and control displayed content by motioning (e.g., with his/her hand or some other tangible object like a stylus) within the vicinity of the touch-screen display and do not require physical contact with the touch-screen. When a user interacts with and controls content displayed on such a touch-screen display by motioning within the vicinity of the touch-screen display, it still may be common to say that the user is touching the content that the user is interacting with or controlling despite the fact that the user may not be physically touching the touch-screen display.

SUMMARY

In one general aspect, an element is initially displayed on an interactive touch-screen display device with an initial orientation relative to the interactive touch-screen display device. One or more images of a user of the interactive touch-screen display device are captured. The user is determined to be interacting with the element displayed on the interactive touch-screen display device. In addition, an orientation of the user relative to the interactive touch-screen display device is determined based on at least one captured image of the user of the interactive touch-screen display device. Thereafter, in response to determining that the user is interacting with the displayed element, the initial orientation of the displayed element relative to the interactive touch-screen display device is automatically adjusted based on the determined orientation of the user relative to the interactive touch-screen display device.

Implementations may include one or more of the following features. For example, automatically adjusting the initial orientation of the displayed element relative to the interactive touch-screen display device may involve changing the initial orientation of the displayed element relative to the interactive touch-screen display device based on the determined orientation of the user relative to the interactive touch-screen display device and/or maintaining the initial orientation of the displayed element relative to the interactive touch-screen display device unchanged based on the determined orientation of the user relative to the interactive touch-screen display device.

In some implementations, the user may be determined to be interacting with the element displayed on the interactive touch-screen display device based on determining that the user is moving the element displayed on the interactive touch-screen display device toward the user or away from the user. Similarly, the user may be determined to be interacting with the element displayed on the interactive touch-screen display device based on determining that the user moved the displayed element from a first location on the interactive touch-screen display device to a second location on the interactive touch-screen display device. In such implementations, the initial orientation of the displayed element relative to the interactive touch-screen display device may be adjusted based on the determined orientation of the user relative to the interactive touch-screen display device as well as the second location on the interactive touch-screen display device. Additionally or alternatively, the user may be determined to be interacting with the element displayed on the interactive touch-screen display device when the user is determined to be gesturing in the vicinity of the element displayed on the interactive touch-screen display device. In various implementations, the user may be determined to be interacting with the element displayed on the interactive touch-screen display device based on at least one captured image of the user of the interactive touch-screen display device.

The displayed element may have a top and a bottom, and the initial orientation of the displayed element may be adjusted such that, after adjusting the initial orientation of the displayed element, the top of the displayed element is above the bottom of the displayed element within a field of vision of the user.

In some implantations, another element also may be displayed on the interactive touch-screen display device with an initial orientation relative to the interactive touch-screen display device. One or more images of another user of the interactive touch-screen display device may be captured. In addition, the other user may be determined to be interacting with the other element displayed on the interactive touch-screen display device. The orientation of the other user relative to the interactive touch-screen display device may be determined based on at least one captured image of the other user of the interactive touch-screen display device. Thereafter, in response to determining that the other user is interacting with the other displayed element, the initial orientation of the other displayed element relative to the interactive touch-screen display device may be automatically adjusted based on the determined orientation of the other user relative to the interactive touch-screen display device.

In some cases, a determination may be made, while the user is interacting with the element displayed on the interactive touch-screen display device, that the orientation of the user relative to the interactive touch-screen display device has changed from a first orientation of the user relative to the interactive touch-screen display device to a second orientation of the user relative to the interactive touch-screen display device. In such cases, the initial orientation of the displayed element relative to the interactive touch-screen display device may be adjusted automatically based on the second orientation of the user relative to the interactive touch-screen display device.

Additionally or alternatively, in response to the user's interaction with the element displayed on the interactive touch-screen display device, another element may be displayed on the interactive touch-screen display device with an initial orientation relative to the interactive touch-screen display device that is based on the determined orientation of the user relative to the interactive touch-screen display device.

In some cases, it may be determined that the user is moving the element displayed on the interactive touch-screen display device away from the user and toward another user of the interactive touch-screen display device. In such cases, one or more images of the other user of the interactive touch-screen display device may be captured, and an orientation of the other user relative to the interactive touch-screen display device may be determined based on at least one captured image of the other user of the interactive touch-screen display device. Thereafter, in response to determining that the user is moving the element displayed on the interactive touch-screen display device away from the user and toward the other user, the orientation of the displayed element relative to the interactive touch-screen display device may be automatically adjusted based on the determined orientation of the other user relative to the interactive touch-screen display device.

In some implementations, the one or more captured images of the user may include some portion of the user's body. The orientation of the user's body relative to the at least one captured image of the user that includes the portion of the user's body may be determined. Thereafter, the orientation of the user relative to the interactive touch-screen display device may be determined based on the determined orientation of the user's body relative to the at least one captured image of the user that includes the portion of the user's body.

For example, after determining that the user is interacting with the displayed element, one or more images of the user that include at least a portion of the user's arm may be captured. The orientation of the user's arm relative to the at least one captured image of the user that includes the portion of the user's arm then may be determined. Thereafter, the orientation of the user relative to the interactive touch-screen display device may be determined based on the determined orientation of the user's arm relative to the at least one captured image of the user that includes the portion of the user's arm.

Similarly, after determining that the user is interacting with the displayed element, one or more images of the user that include at least a portion of the user's head may be captured. The orientation of the user's head relative to the at least one captured image of the user that includes the portion of the user's head then may be determined. Thereafter, the orientation of the user relative to the interactive touch-screen display device may be determined based on the determined orientation of the user's head relative to the at least one captured image of the user that includes the portion of the user's head.

Additionally or alternatively, after determining that the user is interacting with the displayed element, one or more images of the user that include at least a portion of the user's face may be captured. The orientation of at least one facial feature of the user relative to the at least one captured image of the user that includes the portion of the user's face then may be determined. Thereafter, the orientation of the user relative to the interactive touch-screen display device may be determined based on the determined orientation of the at least one facial feature of the user relative to the at least one captured image of the user that includes the portion of the user's face.

In another general aspect, an element is initially displayed on an interactive touch-screen display device with an initial orientation relative to the interactive touch-screen display device. One or more images of a user of the interactive touch-screen display device are captured. The user is determined to be interacting with the element displayed on the interactive touch-screen display device. In addition, an orientation of the user relative to the displayed element then is determined based on at least one captured image of the user of the interactive touch-screen display device. Thereafter, in response to determining that the user is interacting with the displayed element, the initial orientation of the displayed element relative to the interactive touch-screen display device is automatically adjusted based on the determined orientation of the user relative to the displayed element.

In yet another general aspect, one or more images of a user of an interactive touch-screen display device are captured. An orientation of the user relative to the interactive touch-screen display device is determined based on at least one captured image of the user of the interactive touch-screen display device. Thereafter, an element is initially displayed on the interactive touch-screen display device with an initial orientation relative to the interactive touch-screen display device that is based on the determined orientation of the user relative to the interactive touch-screen display device.

In still another general aspect, a system includes an interactive touch-screen display device, a camera configured to capture images of one or more users of the interactive touch-screen display device, and a processing unit. The processing unit is configured to cause a display of an element on the interactive touch-screen display device with an initial orientation relative to the interactive touch-screen display device and to determine that a user is interacting with the element displayed on the interactive touch-screen display device. In addition, the processor also is configured to determine an orientation of the user relative to the interactive touch-screen display device based on at least one image of the user of the interactive touch-screen display device captured by the camera, and to automatically adjust the initial orientation of the displayed element relative to the interactive touch-screen display device based on the determined orientation of the user relative to the interactive touch-screen display device and in response to a determination that the user is interacting with the displayed element.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program embodied in a tangible, computer-readable medium. The tangible, computer-readable medium may include, for example, instructions, software, images, and other data.

The details of one or more implementations are set forth in the accompanying drawings and the description below. Other features will be apparent from the description and the drawings.

DESCRIPTION OF DRAWINGS

FIGS. 2b, 2c, 3a, and 3b are illustrations of two users interacting with the touch-screen display of the tabletop computing system of FIG. 2a.

DETAILED DESCRIPTION

Figure 1A:
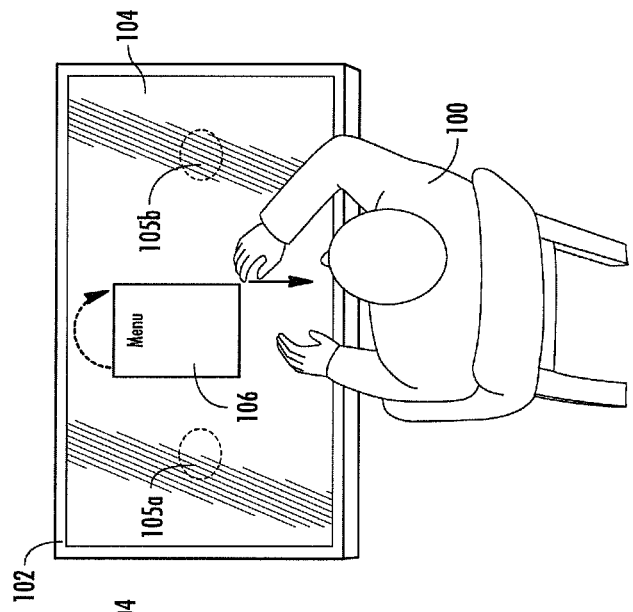
FIGS. 1a and 1b are illustrations of a user interacting with an electronic device that has a touch-screen display and that is configured to adjust the orientation of a displayed element in accordance with the user's orientation relative to the touch-screen display.

To improve a user's ability to interact with and/or control an element displayed on a touch-screen display, the orientation of the user relative to the touch-screen display (or the displayed element) may be determined by capturing and processing a photograph or other image of the user, and the displayed element may be automatically oriented in a manner that is appropriate for the user without requiring the user to explicitly request that the element be displayed with a particular orientation. In addition, as the orientation of the user changes relative to the touch-screen display (or the displayed element), the displayed element may be reoriented to accommodate the user.

For example, a user may sit down at a tabletop computer that has a touch-screen display, and the user may be interested in viewing an element that is displayed on the touch-screen display. However, when the user sits down at the tabletop computer, the element that the user is interested in viewing may be relatively far away from the user and the element also may be upside down relative to the user. In order to bring the element closer to the user and thereby improve the user's ability to view the element, the tabletop computer may be configured to enable the user to touch the element on the touch-screen display and drag it closer to the user. However, even with the element being closer to the user, the user still may have difficulty viewing the element if the element remains upside down relative to the user. Therefore, when the tabletop computer determines that the user is interacting with the element (i.e., dragging the element closer to the user), the tabletop computer may be configured to determine the orientation of the user relative to the touch-screen display (or the displayed element) by capturing and processing one or more images of the user and, after determining the orientation of the user, the tabletop computer may adjust the orientation of the element so that it is right-side-up relative to the user.

It will be appreciated that the relationship between the orientation of a user of a touch-screen display and the orientation of the touch-screen display (or the orientation of an element displayed on the touch-screen display) may be described from the perspective of the user or from the perspective of the touch-screen display (or the element displayed on the touch-screen display), but that irrespective of the perspective from which the relationship is described, the relationship will be the same. Accordingly, the phrases "orientation of the user relative to the touch-screen display (or the element displayed on the touch-screen display)" and "orientation of the touch-screen display (or orientation of the element displayed on the touch-screen display) relative to the user" (and similar such phrases) may be used interchangeably throughout this disclosure.

In order to determine the orientation of a user relative to a touch-screen display (or an element displayed on the touch-screen display), a camera may be used to capture one or more still or video images of the user, and the images may be processed to determine the orientation of the user relative to the touch-screen display (or an element displayed on the touch-screen display). For example, the camera may take one or more still or video images of the user's face, and the orientation of the user relative to the touch-screen display (or the element displayed on the touch-screen display) may be determined based on the orientation of the user's face in the still or video image(s) captured by the camera. Additionally or alternatively, the camera may take one or more still or video images of the user's hand and/or arm, and the orientation of the user relative to the touch-screen display (or the element displayed on the touch-screen display) may be determined based on the orientation of the user's hand and/or arm in the still or video image(s) captured by the camera.

Figure 1B:
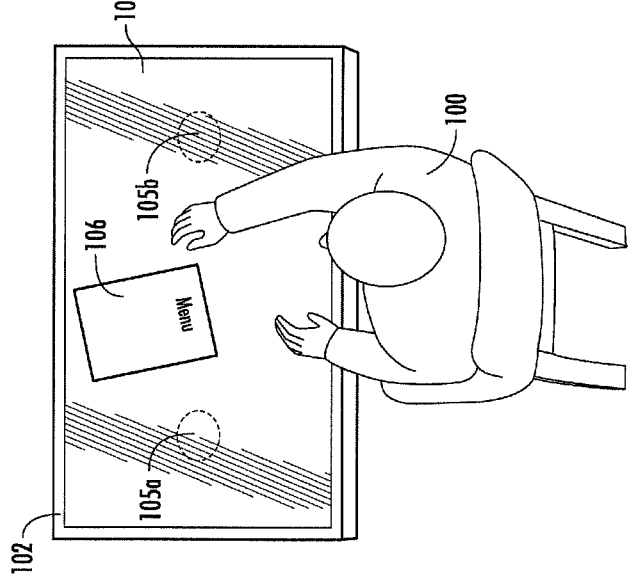

FIGS. 1a and 1b are illustrations of a user 100 interacting with an electronic device 102 that has a touch-screen display 104 and that is configured to adjust the orientation of a displayed element in accordance with the user's orientation relative to the touch-screen display 104 (or the displayed element). The electronic device 102 includes (or otherwise has access to) one or more cameras 105(a) and 105(b) and is configured to use the camera(s) 105(a) and 105(b) to capture one or more still or video images of the user 100 and to determine the orientation of the user 100 relative to the touch screen display 104 (or a displayed element) by processing the image(s) of the user 100 taken using the camera(s) 105(a) and 105(b).

As illustrated in FIGS. 1a and 1b, the camera(s) 105(a) and 105(b) are located internally within the electronic device 102 behind (or underneath) the touch-screen display 104. In other implementations, the camera(s) 105(a) and 105(b) may be located outside of the electronic device 102. For example, the camera(s) 105(a) and 105(b) may be located overhead the electronic device 102 (or user 100), below the electronic device 102 (or user 100), and/or beside the electronic device 102 (or user).

As illustrated in FIG. 1a, the touch-screen display 104 is displaying a menu 106 that is oriented substantially upside down relative to the user 100. That is to say, the top of the menu 106 is aligned substantially with the bottom of the user's field of vision and the bottom of the menu 106 is aligned substantially with the top of the user's field of view.

The electronic device 102 is configured to enable the user 100 to interact with and control the menu 106 by touching the touch-screen display 104 in the location where the menu 106 is displayed and/or by otherwise motioning in the vicinity of the location where the menu 106 is displayed. For instance, the electronic device 102 is configured to enable the user 100 to drag the menu 106 closer to the user 100 to enable the user 100 to view the menu 106 more easily.

In response to detecting that the user 100 is interacting with the menu 106 (e.g., dragging the menu 106 toward the user 100), the electronic device 102 is configured to determine the orientation of the user 100 relative to the touch-screen display 104 (or the menu 106) and to automatically adjust the orientation of the menu 106 so that the orientation of the menu 106 is aligned appropriately with the orientation of the user 100. In particular, the electronic device 102 is configured to process one or more image(s) captured by the camera(s) 105(a) and 105(b) to determine the orientation of the user 100 relative to the touch-screen display 104 (or the menu 106) and, thereafter, without requiring the user to explicitly request that the menu 106 be reoriented, adjust the orientation of the menu 106 so that the orientation of the menu 106 is aligned appropriately with the orientation of the user 100.

As illustrated in FIG. 1b, the user 100 has dragged the menu 106 closer to the user 100. Therefore, in response to detecting that the user 100 was interacting with the menu 106 (i.e., dragging the menu 106 closer to the user 100), the electronic device 102 processed one or more images of the user 100 captured by the camera(s) 105(a) and 105(b) to determine the orientation of the user 100 relative to the touch-screen display 104, determined that the menu 106 was oriented upside down relative to the user 100, and adjusted the orientation of the menu 106 such that the menu 106 is oriented right-side-up relative to the user 100.

Figure 2A:
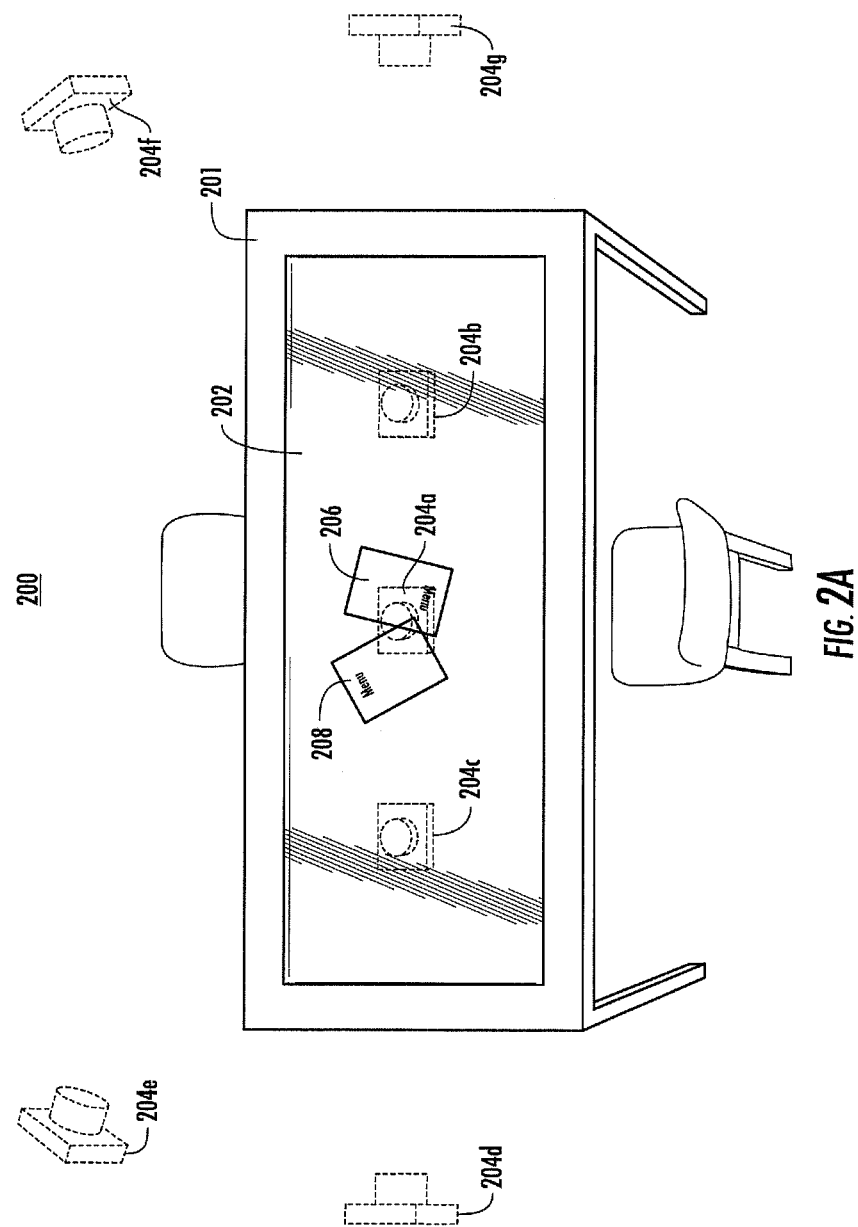
FIG. 2a is an illustration of a tabletop computing system that has a touch-screen display and that is configured to adjust the orientation of an element displayed on the touch-screen display in accordance with a user's orientation relative to the touch-screen display.

FIG. 2a is an illustration of a tabletop computing system 200 that includes a tabletop computer 201 having a touch-screen display 202 and that is configured to adjust the orientation of an element displayed on the touch-screen display 202 in accordance with a user's orientation relative to the touch-screen display 202 (or the displayed element).

In addition to the tabletop computer 201, the tabletop computing system 200 also includes one or more cameras 204(a), 204(b), 204(c), 204(d), 204(e), 204(f), and 204(g). The one or more cameras 204(a), 204(b), 204(c), 204(d), 204(e), 204(f), and 204(g) enable the tabletop computing system 200 to capture still or video images of users interacting with the touch-screen display 202. In some implementations, the tabletop computing system 200 is configured to process captured images to detect user interaction with the touch-screen display 202 and to control operation of the touch-screen computing system 200 appropriately. Alternatively, in other implementations, the tabletop computing system 200 may employ other technologies to detect user interaction with the touch-screen display 202. For example, the tabletop computing system 200 may detect user interaction with the touch-screen display 202 using technologies that sense user contact with the touch-screen display 202.

The tabletop computing system 200 also is configured to process captured images of users to determine the orientation of the users relative to the touch-screen display 202 (or elements displayed on the touch-screen display 202) and to automatically adjust the orientation of displayed elements to align the displayed elements in a manner that is appropriate for the user without requiring the user to explicitly request that the elements be reoriented. In some implementations, the tabletop computing system 200 may be configured to wait to automatically adjust the orientation of a displayed element relative to a user until the tabletop computing system 200 determines that the user is interacting with the displayed element.

Referring to FIG. 2a, the one or more cameras 204(a), 204(b), 204(c), 204(d), 204(e), 204(f), and 204(g) may be located in various different positions both internal to the tabletop computer 201 and external to the tabletop computer 201. For example, cameras 204(a), 204(b), and 204(c) are located within the tabletop computer 201 behind (or beneath) the touch-screen display 202. In contrast, cameras 204(d), 204(e), 204(f), and 204(g) are located outside of the tabletop computer 201. Of course, cameras could be located in additional or alternative locations to those illustrated in FIG. 2a.

As illustrated in FIG. 2a, two menus 206 and 208 are displayed on the touch-screen display 202. In some implementations, the menus 206 and 208 initially may be displayed with arbitrary orientations or with orientations that are not necessarily related to the orientations of users that are interacting with (or otherwise in the vicinity of) the tabletop computing system 200. However, after the tabletop computing system 200 determines that a user is interacting with one of the menus 206 or 208, the tabletop computing system 200 may determine the orientation of the user relative to the touch-screen display 202 (or the menu 206 or 208 with which the user is interacting) by capturing one or more images of the user with the camera(s) 204(a), 204(b), 204(c), 204(d), 204(e), 204(f), and 204(g) and then processing the captured image(s). After the tabletop computing system 200 determines the orientation of the user relative to the touch-screen display 202 (or the menu 206 or 208 with which the user is interacting) and without receiving an explicit request from the user to reorient the menu 206 or 208, the tabletop computing system 200 may automatically adjust the orientation of the menu 206 or 208 with which the user is interacting such that the orientation of the menu 206 or 208 is better aligned with the orientation of the user.

Figure 2B:
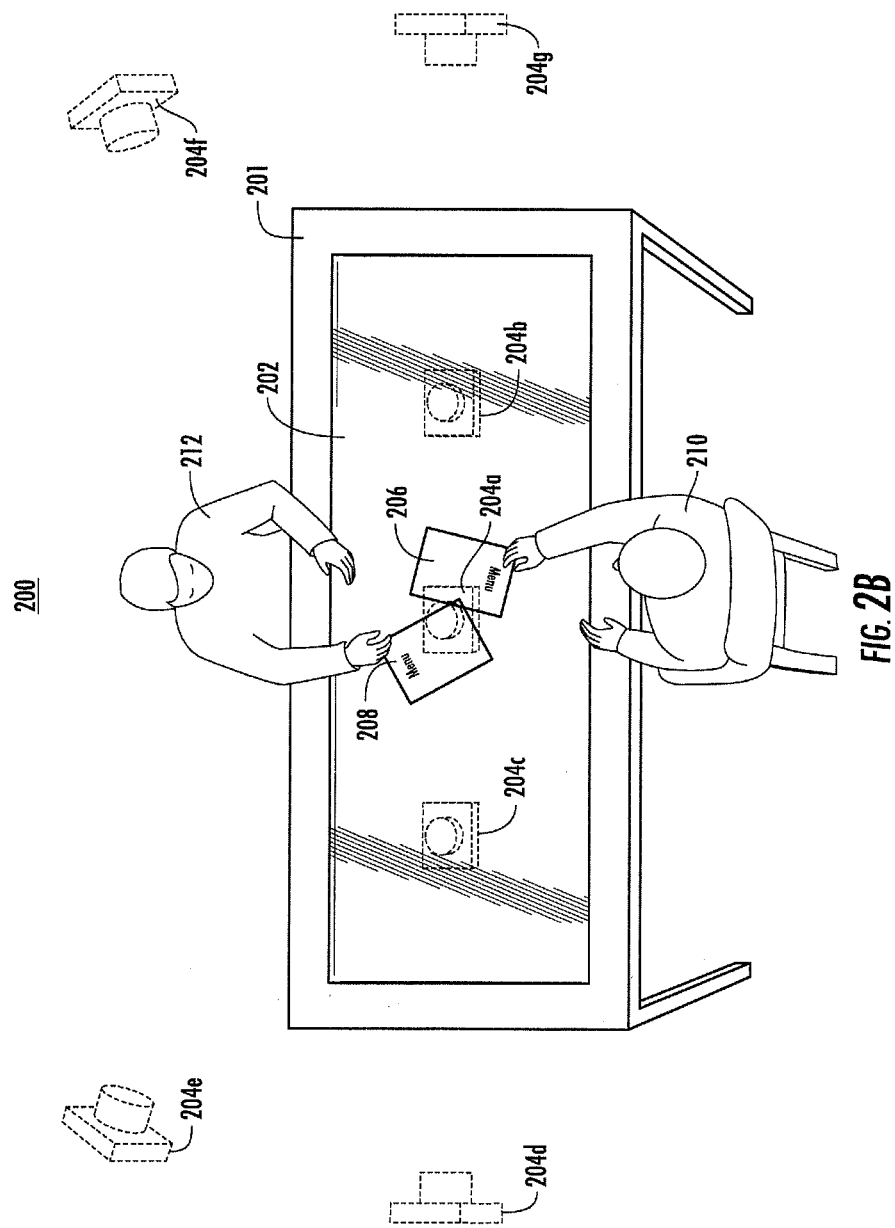

FIGS. 2b and 2c are illustrations of a first user 210 and a second user 212 interacting with the touch-screen display 202 of the tabletop computing system 200 of FIG. 2a. As illustrated in FIG. 2b, first user 210 is sitting at the tabletop computer 201 such that the orientation of menu 206 is upside down relative to the orientation of the first user 210 and the orientation of menu 208 is right-side-up relative to the orientation of the first user 212. Similarly, second user 212 is sitting at the tabletop computer 201 such that the orientation of menu 208 is upside down relative to the second user 212 and the orientation of menu 206 is right-side-up relative to the second user 212.

As further illustrated in FIG. 2b, the first user 210 is reaching for and dragging menu 206 closer to him/herself and the second user 212 is reaching for and dragging menu 208 closer to him/herself. In response to determining that the first user 210 is interacting with menu 206 and the second user 212 is interacting with menu 208, the tabletop computing system 200 is configured to determine the orientation of the first user 210 relative to the touch-screen display 202 (or menu 206) and the orientation of the second user 212 relative to the touch-screen display 202 (or menu 208) and to automatically adjust the orientation of menu 206 such that the orientation of menu 206 is better aligned with the orientation of the first user 210 and to automatically adjust the orientation of menu 208 such that the orientation of menu 208 is better aligned with the orientation of the second user 212. In particular, the tabletop computing system 200 is configured to determine the orientation of the first user 210 relative to the touch-screen display 202 (or menu 206) by capturing one or more images of the first user 210 with the camera(s) 204(a), 204(b), 204(c), 204(d), 204(e), 204(f), and 204(g) and then processing the captured image(s) of the first user 210. Similarly, the tabletop computing system 200 is configured to determine the orientation of the second user 212 relative to the touch-screen display 202 (or menu 208) by capturing one or more images of the second user 210 with the camera(s) 204(a), 204(b), 204(c), 204(d), 204(e), 204(f), and 204(g) and then processing the captured image(s) of the second user 212.

Automatically adjusting the orientations of menus 206 and 208 in response to determining that the first user 210 is interacting with menu 206 and that the second user 212 is interacting with menu 208 as described above may enable the first user 210 and the second user 212 to interact with the menus 206 and 208 more easily and more efficiently than 15 systems that require users to explicitly manipulate the orientation of displayed elements with which they are interacting.

Referring to FIG. 2c, in response to determining that the first user 210 was interacting with menu 206, the tabletop computing system 200 determined the orientation of the first user 210 relative to the touch-screen display 202 (or menu 206) by processing one or more images captured by the camera(s) 204(a), 204(b), 204(c), 204(d), 204(e), 204(f), and 204(g) and automatically adjusted the orientation of menu 206 such that the orientation of menu 206 is right-side-up relative to the first user 210 without having required the first user 210 to take any action other than merely interacting with the menu 206 (i.e., dragging the menu 206 closer to the first user 210). Similarly, in response to determining that the second user 210 was interacting with menu 208, the tabletop computing system 200 determined the orientation of the second user 212 relative to the touch-screen display 202 (or menu 208) by processing one or more images captured by the camera(s) 204(a), 204(b), 204(c), 204(d), 204(e), 204(f), and 204(g) and automatically adjusted the orientation of menu 208 such that the orientation of menu 208 is right-side-up relative to the second user 212 without having required the second user 212 to take any action other than merely interacting with the menu 208 (i.e., dragging the menu 208 closer to the second user 212).

In some implementations, the tabletop computing system 200 may be configured to determine that a user is interacting with an element displayed on the touch-screen display 202 although the user has not actually touched the displayed element on the touch-screen display 202. For example, by processing images captured by the camera(s) 204(a), 204(b), 204(c), 204(d), 204(e), 204(f), and 204(g), the tabletop computing system 200 may be able to determine that a user has been visually focused on a particular element displayed on the touch-screen display 202 for more than a threshold period of time, and, in response, the tabletop computing system 200 may infer that the user is interested in the displayed element despite the fact that the user has not touched the displayed element on the touch-screen display 202. Accordingly, the tabletop computing system 200 may process one or more image(s) captured by the camera(s) 204(a), 204(b), 204(c), 204(d), 204(e), 204(f), and 204(g) to determine the user's orientation relative to the touch-screen display 202 (or the displayed element) and automatically adjust the orientation of the displayed element to better align with the orientation of the user.

Additionally or alternatively, a user's interaction with an element that is displayed on the touch-screen display 202 and that already has been reoriented in accordance with the user's orientation relative to the touch-screen display 202 (or the displayed element) may cause a new element to be displayed on the touch-screen display 202. In such situations, the tabletop computing system 200 may display the new element with an initial orientation that is appropriate given the user's orientation relative to the touch-screen display 202 (or the displayed element).

Figure 3A:
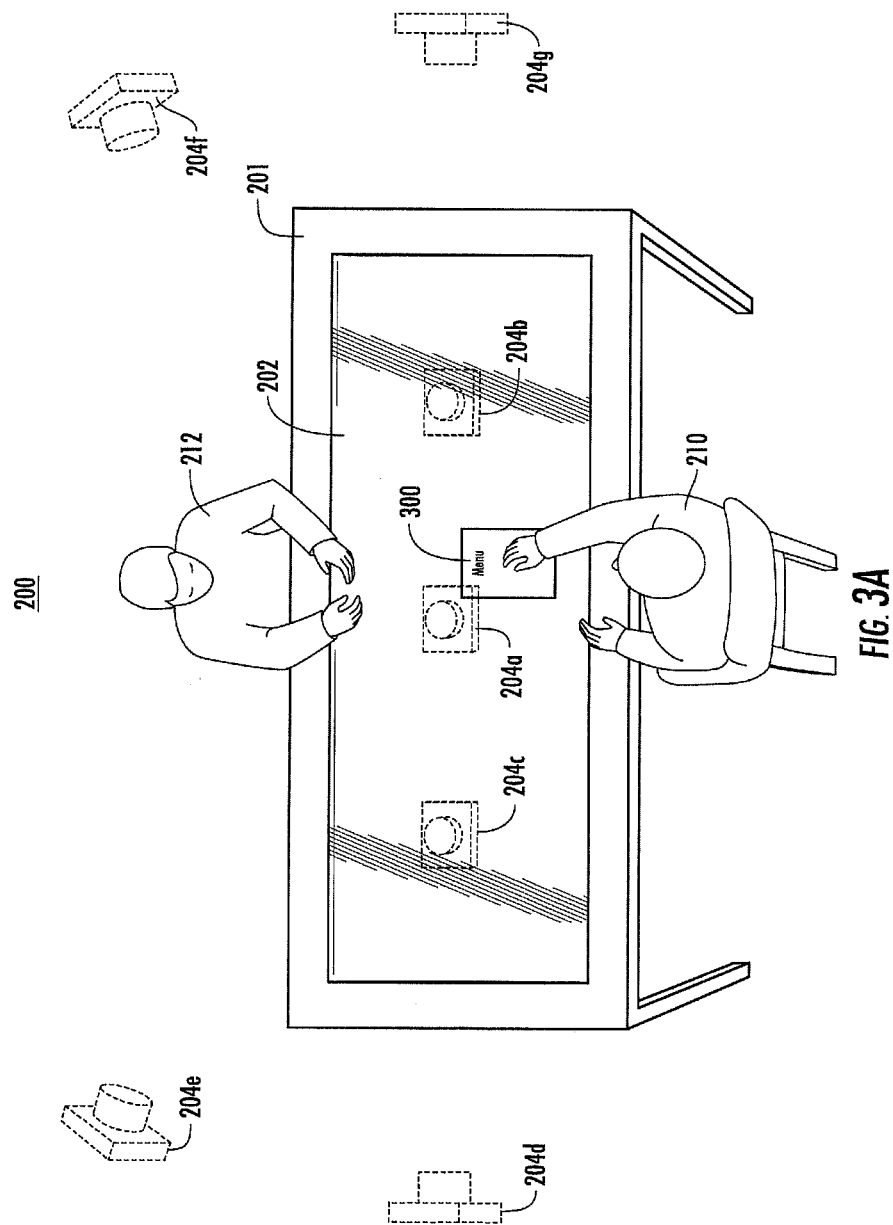
Figure 3B:
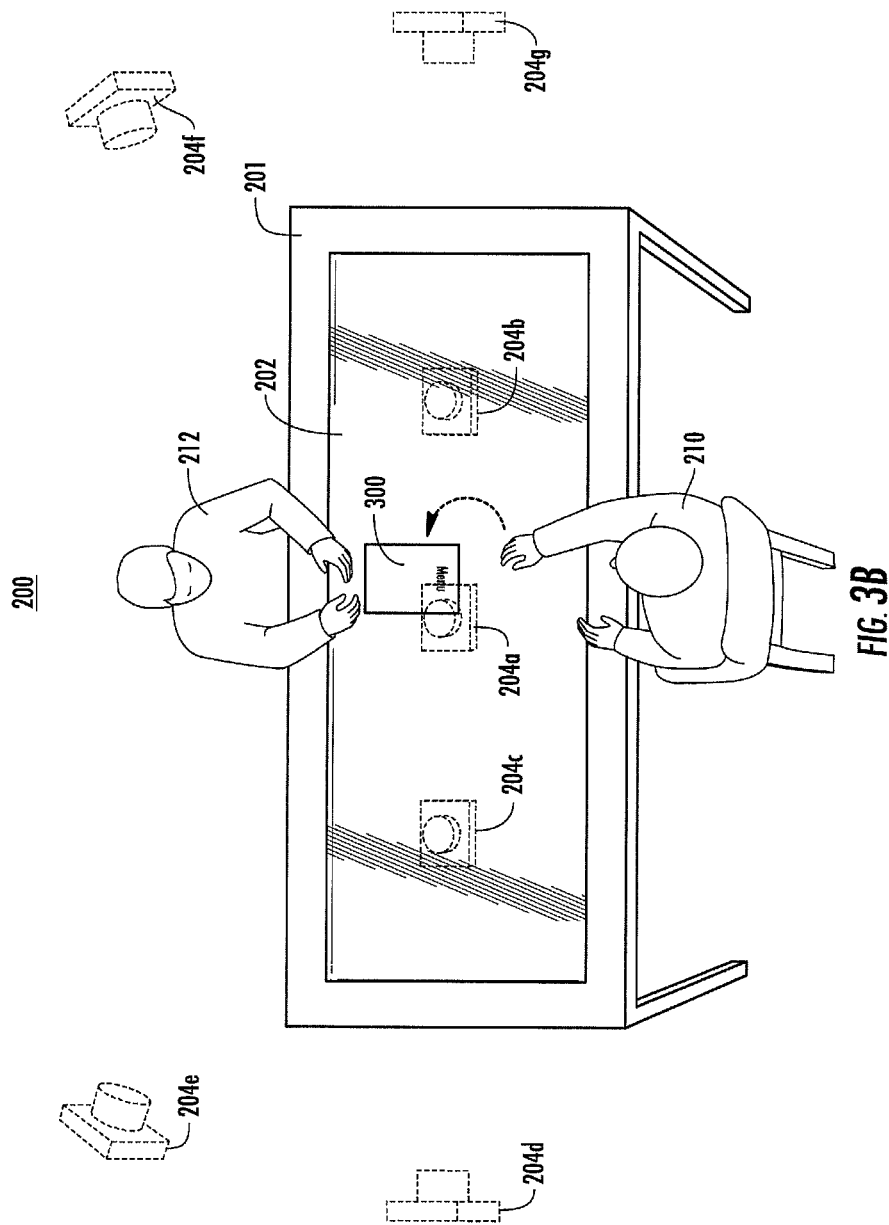

FIGS. 3a and 3b are illustrations of the first user 210 and the second user 212 interacting with the touch-screen display 202 of the tabletop computing system 200 that demonstrate one example of the tabletop computing system 200 determining that a user is interacting with an element displayed on the touch-screen display 202 although the user has not actually touched the displayed element on the touch-screen display 202. In particular, as illustrated in FIG. 3a, the first user 210 is interacting with (i.e., touching) a menu 300 displayed on the touch-screen display 202. Consequently, the tabletop computing system 200 has automatically oriented the menu 300 such that the orientation of the menu 300 is right-side-up relative to the first user 300.

Referring now to FIG. 3b, the first user 210 is illustrated as pushing the menu 300 away from the first user 210 and toward the second user 212. As the first user pushes the menu away from the first user 210 and toward the second user 212, the tabletop computing system 200 is configured to process one or more image(s) captured by the camera(s) 204(a), 204(b), 204(c), 204(d), 204(e), 204(f), and 204(g) and to determine that the first user 210 is pushing the menu 300 away from him/herself and toward the second user 212. In response to determining that the first user 210 is pushing the menu 300 away from him/herself, the tabletop computing system 200 can infer that the second user 212 is now (or soon will be) interacting with the menu 300 despite the fact that the second user 212 has not yet touched the menu 300 on the touch-screen display. Accordingly, the tabletop computing system 200 is configured to process one or more image(s) captured by the camera(s) 204(a), 204(b), 204(c), 204(d), 204(e), 204(f), and 204(g) to determine the orientation of the second user 212 relative to the touch-screen display 202 (or the menu 300) so that the tabletop computing system 200 can adjust the orientation of the menu 300 to be better aligned with the orientation of the second user 212. Thus, as illustrated in FIG. 3b, the tabletop computing system 200 has adjusted the orientation of the menu 300 such that the orientation of the menu is right-side-up relative to the second user 212 notwithstanding that the second user 212 has yet to touch the menu 300 on the touch-screen display.

Although described above in the context of a tabletop computing environment, the techniques for orienting elements displayed on a touch-screen display that are disclosed herein are equally applicable to any other configuration of a touch-screen display. For example, in addition to tabletop touch-screen displays, touch-screen displays that are mounted on walls or similar structures or that are included within handheld devices may be configured to automatically adjust the orientation of displayed elements to better align with users that are interacting with the displayed elements without requiring the users to explicitly request that the displayed elements be reoriented.

Figure 4A:
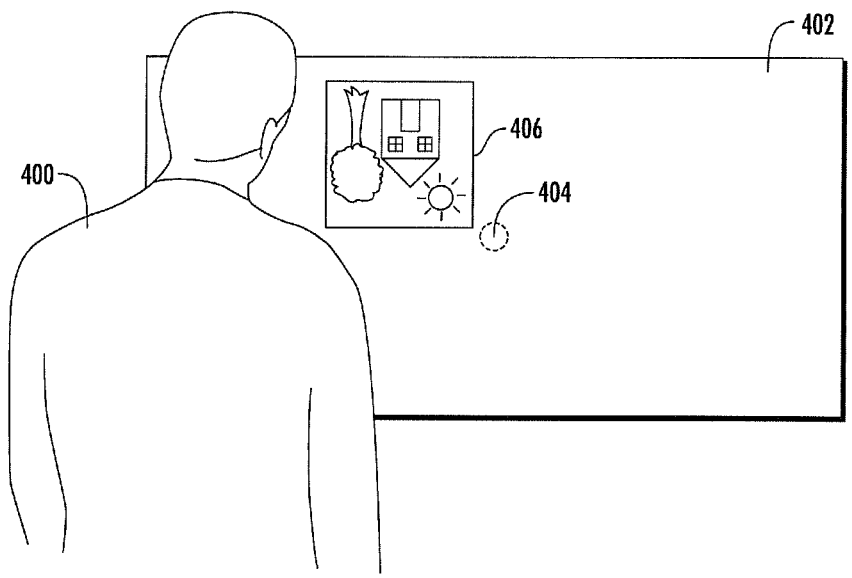
FIGS. 4a and 4b are illustrations of a user interacting with an electronic device that has a touch-screen display that is mounted on a wall.
Figure 4B:
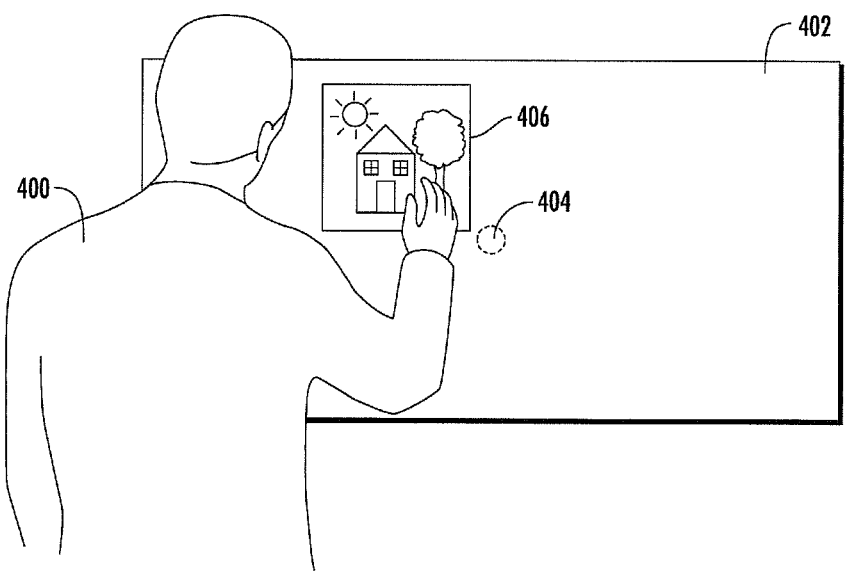

FIGS. 4a and 4b are illustrations of a user 400 interacting with an electronic device that has a touch-screen display 402 that is mounted on a wall. As illustrated in FIGS. 4a and 4b, the electronic device includes a camera 404 that is located behind the touch-screen display 402. However, the camera 404 also could be located elsewhere and the electronic device also could employ one or more other cameras to capture images of the user 400.

Referring to FIG. 4a, an image 406 is displayed on the touch-screen display 402, and the user 400 is passively observing the image 406 without interacting with it. As illustrated in FIG. 4a, the orientation of the image is substantially upside down relative to the user 400.

The electronic device is configured to detect when the user 400 is touching (or otherwise interacting with) the image 406 and to automatically adjust the orientation of the image 406 to be appropriately aligned with the user 400 in response to detecting that the user 400 is touching (or otherwise interacting with) the image 406. In particular, in response to detecting that the user 400 is touching (or otherwise interacting with) the image 406, the electronic device is configured to process one or more images of the user 400 captured by the camera 404 to determine the orientation of the user 400 relative to the touch-screen display 402 (or the image 406). After determining the orientation of the user 400 relative to the touch-screen display 402 (or the image 406), the electronic device is configured to adjust the orientation of the image 406 (if necessary) so that the orientation of the image 406 is more appropriately aligned with the user 400.

Referring to FIG. 4b, the user 400 is touching the image 406 on the touch-screen display 402. In response to detecting that the user 400 is touching the image 406 on the touch-screen display 402, the electronic device has processed one or more images captured by the camera 404 to determine the orientation of the user relative to the touch-screen display 402 (or the image 406) and adjusted the orientation of the image 406 such that the orientation of the image 406 is right-side-up relative to the orientation of the user 400.

Figure 5:
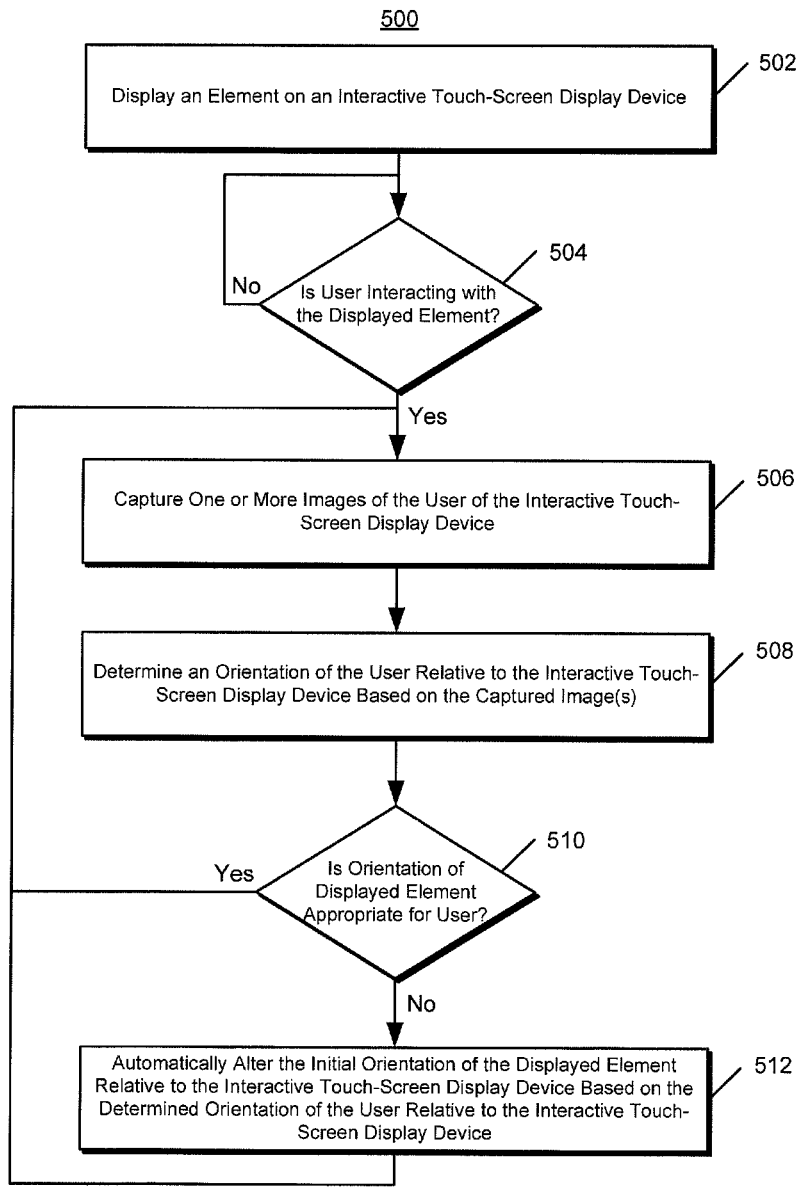
FIG. 5 is a flowchart of an example of a process for automatically adjusting the orientation of an element displayed on a touch-screen display.

FIG. 5 is a flowchart 500 of an example of a process for automatically adjusting the orientation of an element displayed on a touch-screen display. In general, an element is displayed on an interactive touch-screen display. In response to detecting that a user of the interactive touch-screen display is interacting with the displayed element, a camera or other device captures one or more images of the user, and the images are processed to determine an orientation of the user relative to the interactive touch-screen display (or the displayed element). After the orientation of the user relative to the interactive touch-screen display (or the displayed element) is determined, the orientation of the displayed element is automatically adjusted without requiring the user to explicitly request that the displayed element be reoriented.

The process for automatically adjusting the orientation of an element that is displayed on the touch-screen display that is illustrated in FIG. 5 may be performed by, or in association with, the electronic device 102 of FIGS. 1a and 1b, the table-top computing system 200 of FIGS. 2a-2c and 3a and 3b, the electronic device of FIG. 4, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for automatically adjusting the orientation of a displayed element. In some implementations, the processor(s) may communicate and cooperate with (or otherwise control) various other associated hardware in order to perform the process for automatically adjusting the orientation of a displayed element.

Initially, an element is displayed on the interactive touch-screen display device (502). Thereafter, the interactive touch-screen display device is monitored to determine whether a user is interacting with the displayed element (504). In some implementations, a user may be determined to be interacting with the displayed element if the user is moving the displayed element (e.g., toward or away from the user) or otherwise touching the displayed element on the interactive touch-screen display device. Similarly, a user may be determined to be interacting with the displayed element if the user moved or touched the displayed element on the interactive touch-screen display device within a specified window of time. In such implementations, various different techniques may be employed to determine if a user is touching an element displayed on the interactive touch-screen display device. For example, a camera or other device may be used to capture one or more images of the user, and the images may be processed to determine if the user is touching an element displayed on the interactive touch-screen display device. Additionally or alternatively, the interactive touch-screen display device may be configured to detect that the user (or an object under the user's control, e.g., a stylus) is physically contacting the interactive touch-screen display device. A user also may be determined to be interacting with the displayed element by capturing one or more images of a user and determining, based on the captured image(s), that the user's gaze has been focused on the displayed element for a specified period of time.

If a user is determined to be interacting with the displayed element, a camera or other device is used to capture one or more images of the user (506). The one or more captured images of the user are then processed to determine an orientation of the user relative to the interactive touch-screen display device (or the displayed element) (508). For example, the image(s) of the user may be processed to determine the orientation of a particular body part of the user (e.g., face, head, eyes, hand and/or arm, etc.) relative to the interactive touch-screen display device (or the displayed element) and the orientation of the user relative to the interactive touch-screen display device (or the displayed element) may be inferred from the determined orientation of the particular body part of the user relative to the interactive touch-screen display device (or the displayed element).

In some implementations, the captured image(s) of the user may be processed to determine the orientation of the user (or particular body part(s) of the user) within the captured image. Then, the orientation of the user relative to the interactive touch-screen display device (or the displayed element) may be determined based on the known relationship of the orientation(s) of the camera(s) (or other device(s)) that captured the image(s) of the user relative to the interactive touch-screen display device. In alternative implementations, processing techniques that identify the presence of a user (or particular body part(s) of a user) may be applied to various different orientations of an image of a user, and the orientation of the user relative to the interactive touch-screen display device may be determined based on the orientation of the image in which the presence of the user (or particular body part(s) of the user) was most discernible. Furthermore, in some implementations, the camera(s) (or other device(s)) used to capture the image(s) of the user may be positioned such that the captured image(s) include at least a portion of the user and a portion of the interactive touch-screen display device (or a portion of the displayed element) and the orientation of the user relative to the interactive touch-screen display device (or the displayed element) may be determined directly from the captured image(s) by observing the relationship of the orientation of the user relative to the interactive touch-screen display device (or the displayed element) in the captured image(s).

In some implementations, the images of the user that are processed in order to determine the orientation of the user relative to the interactive touch-screen device actually may be captured before the user is determined to be interacting with the displayed element. For example, processing images of the user that are captured prior to determining that the user is interacting with the displayed element may be advantageous when the user's interaction with the displayed element obscures or otherwise interferes with the camera(s) ability to capture images of the user.

After the orientation of the user relative to the interactive touch-screen display (or the displayed element) has been determined, a determination is made as to whether the orientation of the displayed element is appropriate given the determined orientation of the user (510).

For example, a predefined vertical axis of the displayed element may be compared to a vertical axis of the user determined from the captured image(s) of the user, and the orientation of the displayed element may be determined to be appropriate if the vertical axis of the displayed element is substantially aligned with the determined vertical axis of the user. In some implementations, the predefined vertical axis of the displayed element may be determined to be substantially aligned with the determined vertical axis of the user if the predefined vertical axis of the displayed element is within a specified number of degrees (e.g., +/−15%, +/−30%, +/−45%, etc.) of the determined vertical axis of the user.

Additionally or alternatively, a predefined horizontal axis of the displayed element may be compared to a horizontal axis of the user determined from the captured image(s) of the user, and the orientation of the displayed element may be determined to be appropriate if the horizontal axis of the displayed element is substantially aligned with the determined horizontal axis of the user. In some implementations, the predefined horizontal axis of the displayed element may be determined to be substantially aligned with the determined horizontal axis of the user if the predefined horizontal axis of the displayed element is within a specified number of degrees (e.g., +/−15%, +/−30%, +/−45%, etc.) of the determined horizontal axis of the user.

In other implementations, the displayed element may have a designated top (or bottom) and the orientation of the displayed element may be determined to be appropriate given the determined orientation of the user relative to the interactive touch-screen display device (or the displayed element) if the designated top (or bottom) of the displayed element is substantially aligned with the top (or bottom) of the user's field of view as determined from the captured image(s).

If the orientation of the displayed element is determined to be appropriate given the determined orientation of the user, additional images of the user may be captured and processed so that subsequent changes in the orientation of the user relative to the interactive touch-screen display (or the displayed element) may be detected and the orientation of the displayed element may be adjusted accordingly.

In the event that the orientation of the displayed element is determined to be inappropriate given the determined orientation of the user, the initial orientation of the displayed element relative to the interactive touch-screen display device is automatically altered to an orientation that is appropriate given the determined orientation of the user relative to the interactive touch-screen display device (512). For example, the orientation of the displayed element may be adjusted such that a predefined vertical axis of the displayed element is substantially aligned with a vertical axis of the user determined from the captured image(s) of the user. Additionally or alternatively, the orientation of the displayed element may be adjusted such that a predefined horizontal axis of the displayed element is substantially aligned with a horizontal axis of the user determined from the captured image(s) of the user. Furthermore, the orientation of the displayed element may be adjusted such that a designated top (or bottom) of the displayed element is substantially aligned with the top (or bottom) of the user's field of view as determined from the captured image(s).

After the orientation of the displayed element is altered, additional images of the user may be captured and processed so that subsequent changes in the orientation of the user relative to the interactive touch-screen display device (or the displayed element) may be detected and the orientation of the displayed element may be adjusted accordingly.

In some implementations, multiple processes for automatically adjusting the orientation of an element like the process illustrated in FIG. 5 may be performed in parallel to enable the orientations of multiple different displayed elements to be automatically adjusted relative to multiple different users of the interactive touch-screen display device.

Figure 6:
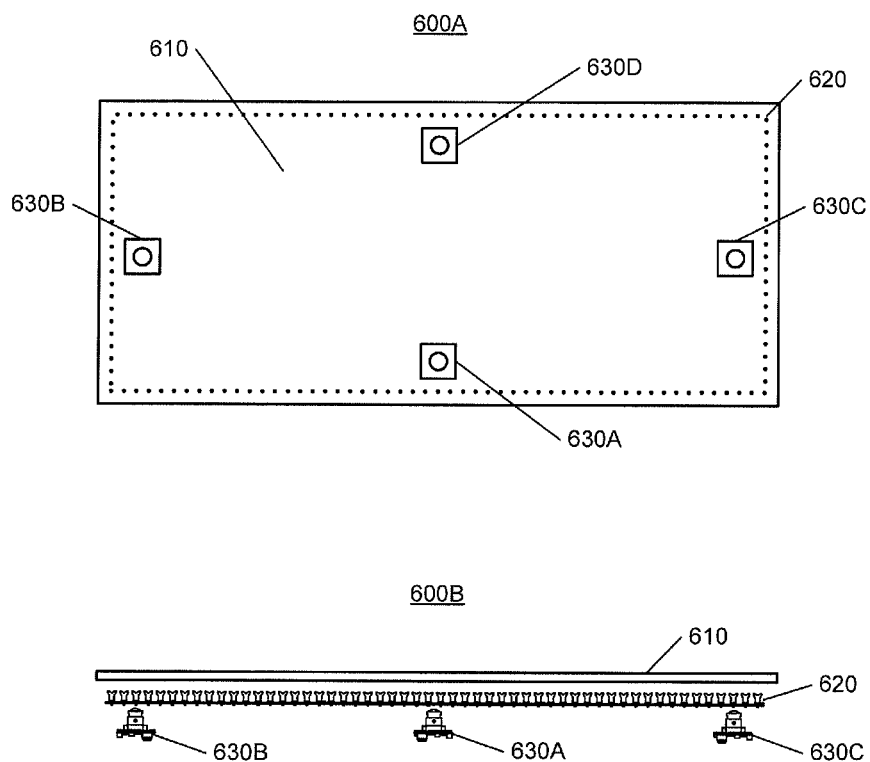
FIGS. 6 and 10 are diagrams of example systems.

FIG. 6 illustrates an example system that includes cameras positioned under a surface computing table. FIG. 6 illustrates an overhead or top view 600A of the example system and a side view 600B of the example system. The system includes a table surface 610, multiple infrared emitters 620 positioned under the table surface 610, and multiple cameras 630A-630D positioned under the table surface 610. The number and arrangement of the multiple infrared emitters 620 and the multiple cameras 630A-630D are exemplary and other numbers and arrangements may be used.

In some implementations, the table surface 610 is a liquid crystal that is switched between opaque and transparent states by an electrical signal. In these implementations, the liquid crystal is set to an opaque state during a first time period (e.g., 1/120th of a second) and a projector under the table surface 610 projects an image. During a second time period (e.g., 1/120th of a second), the liquid crystal is set to a transparent state and the cameras 630A-630D positioned under the table surface 610 capture images of a user through the transparent liquid crystal. When the liquid crystal is set to the transparent state, the projector displays a black image because any image projected would pass through the table and be projected onto the table.

In some examples, the cameras 630A-630D may capture images when the liquid crystal is set to the opaque state to detect finger-touches. Because the screen is opaque, only parts of the user touching or nearly touching the screen are detectable and, as such, detected objects may be identified as finger-touches.

In some implementations, the table surface 610 is a liquid crystal display (LCD). In these implementations, the LCD displays an image during a first time period (e.g., 1/120th of a second) and the LCD's backlight produces light (e.g., white light). During a second time period (e.g., 1/120th of a second) the LCD is set so that every pixel is transparent (if the backlight was on, the image would appear as solid white) and the cameras 630A-630D under the table capture images of the user through the LCD. During this time, the LCD's backlight is switched off so that the image does not appear white to the user or interfere with image capturing.

The multiple infrared emitters 620 positioned under the table surface 610 may illuminate portions of a user above the table surface 610 to enhance the ability of the system to detect a user and the user's orientation relative to the table surface 610. For instance, the multiple infrared emitters 620 may illuminate the user's arm reaching over the table, and optionally the user's face, which, in a dark ambient environment, produces a bright silhouette against a dark or static background. The multiple infrared emitters 620 may be controlled to illuminate in sequence with the cameras 630A-630D capturing images.

Figure 7:
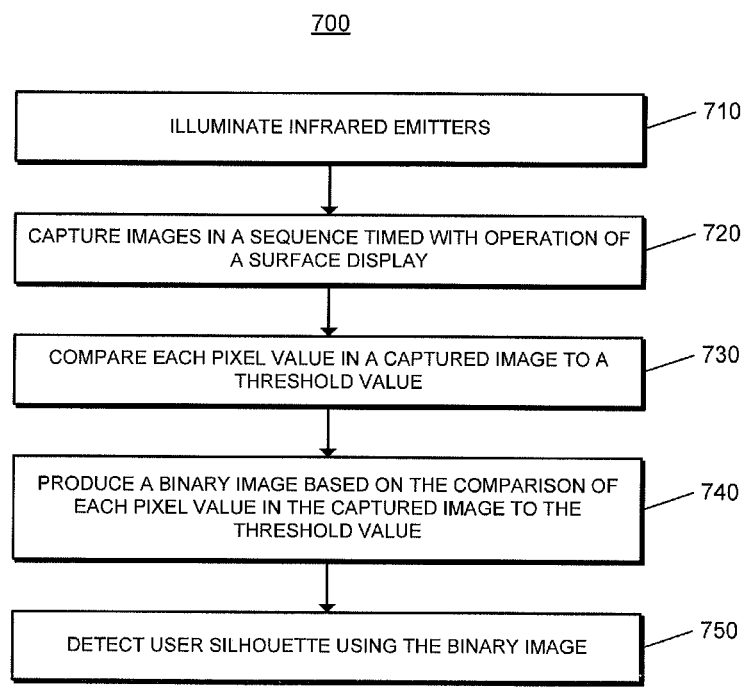
FIGS. 7-9 and 11-13 are flowcharts of example processes.

FIG. 7 illustrates an example process 700 for detecting a user. The process 700 may be performed by, or in association with, the electronic device 102 of FIGS. 1a and 1b, the tabletop computing system 200 of FIGS. 2a-2c and 3a and 3b, the electronic device of FIG. 4, the system shown in FIG. 6, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for detecting a user. In some implementations, the processor(s) may communicate and cooperate with (or otherwise control) various other associated hardware in order to perform the process for detecting a user.

Initially, infrared emitters are illuminated (710) and images are captured in a sequence timed with operation of a surface display (720). For instance, as described above, infrared emitters may be illuminated and images may be captured when the surface display is in a transparent state. The infrared light produced by the infrared emitters illuminates the user's arm more intensely than the ceiling because the user's arm is closer to the infrared emitters than the ceiling. This may enhance ability to detect the user's arm in an image because the user's arm likely will appear brighter than the ceiling.

In some implementations, each pixel value in a captured image is compared to a threshold value (730) and a binary image is produced based on the comparison of each pixel value in the captured image to the threshold value (740). For example, the system accesses a threshold value and compares each pixel value to the accessed threshold value. In this example, the result of the comparison is written to a binary image that corresponds to pixels in the image. When the comparison reveals that the pixel value is greater than the accessed threshold value, a one may be written to the binary image and, when the comparison reveals that the pixel value is less than the accessed threshold value, a zero may be written to the binary image.

Figure 12:
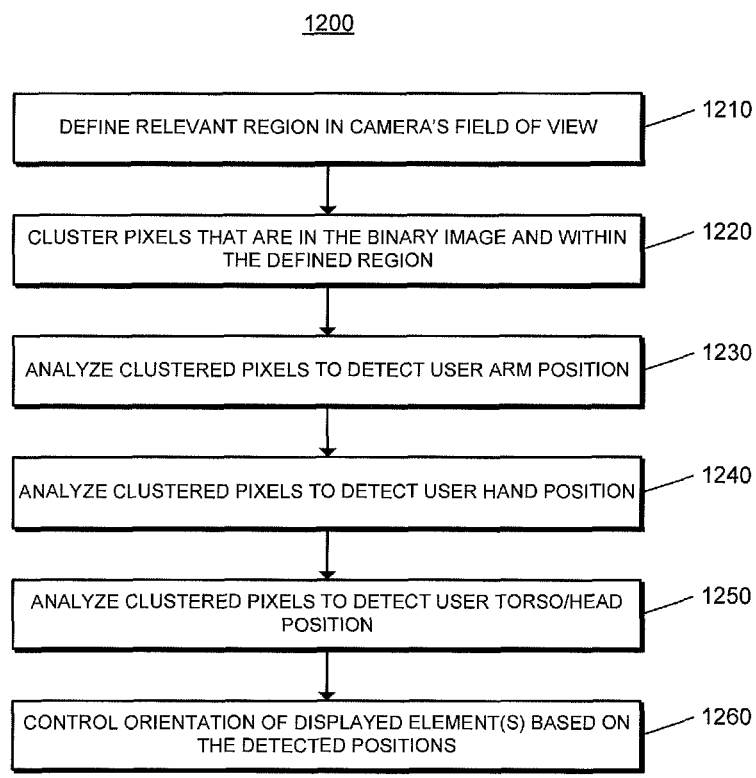

A silhouette of one or more users is detected using the binary image (750). For instance, the binary image is analyzed to detect portions within the binary image that likely correspond to a body part of a user (e.g., a user's arm, a user's hand, a user's face, a user's torso, etc.). Portions of the binary image that are detected as being relatively bright (e.g., have a value greater than the threshold) may be identified as a portion of a user. FIG. 12, discussed below, describes an example of detecting one or more users using a binary image.

Figure 8:
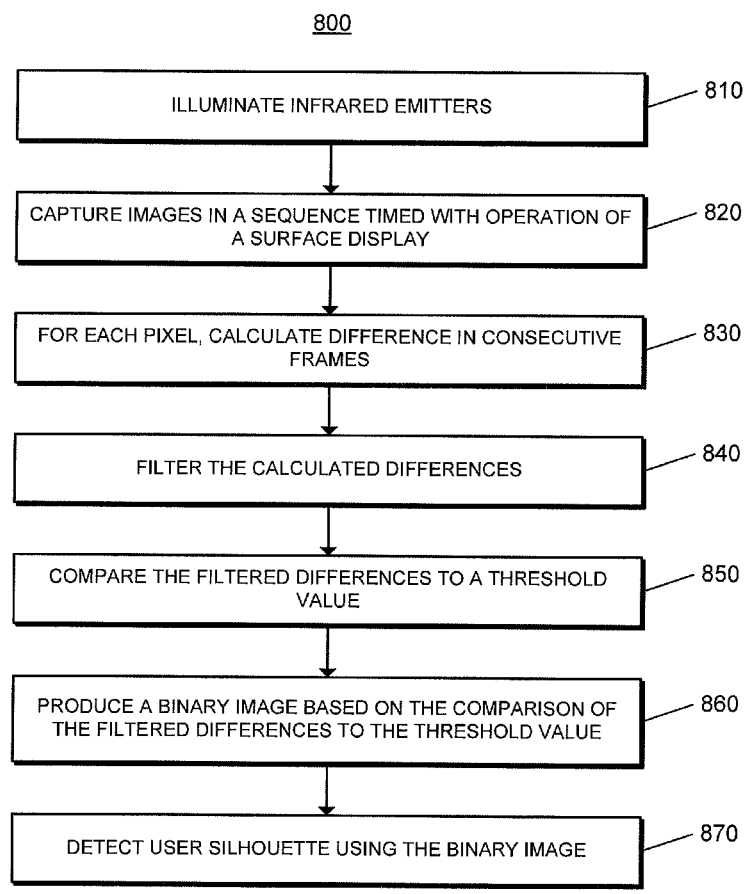

FIG. 8 illustrates an example process 800 for detecting a user. The process 800 may be performed by, or in association with, the electronic device 102 of FIGS. 1a and 1b, the tabletop computing system 200 of FIGS. 2a-2c and 3a and 3b, the electronic device of FIG. 4, the system shown in FIG. 6, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for detecting a user. In some implementations, the processor(s) may communicate and cooperate with (or otherwise control) various other associated hardware in order to perform the process for detecting a user.

Initially, infrared emitters are illuminated (810) and images are captured in a sequence timed with operation of a surface display (820). For instance, as described above, infrared emitters may be illuminated and images may be captured when the surface display is in a transparent state. In other implementations, infrared emitters may not be used.

For each pixel, a difference in consecutive frames is calculated (830) and the calculated differences are filtered (840). For example, a difference (e.g., absolute difference) between corresponding pixels in consecutive frames may be computed and the computed differences may be used to detect motion of an object throughout the consecutive frames.

The filtering operation may be an averaging kernel. In one implementation of the filtering operation, for each pixel, the sum may be calculated for all the pixels within a neighborhood centered on that pixel. In this implementation, the operation may have the following effects. A pixel's difference may be strengthened or weakened by its neighboring pixels. Isolated pixels with large difference values may be suppressed. Also, clusters of pixels having relatively small difference values may be re-enforced, and the shape of clusters may be smoothed.

In some examples, the filtered differences are compared to a threshold value (850) and a binary image is produced based on the comparison of the filtered differences to the threshold value (860). For example, the system accesses a threshold value and compares the filtered differences to the accessed threshold value. In this example, the result of the comparison is written to a binary image that corresponds to pixels in the image. When the comparison reveals that a filtered difference for a pixel is greater than the accessed threshold value, a one may be written to the binary image and, when the comparison reveals that a filtered difference for a pixel is less than the accessed threshold value, a zero may be written to the binary image.

A user silhouette is detected using the binary image (870). For example, the binary image is analyzed to detect portions within the binary image that likely correspond to a body part of a user (e.g., a user's arm, a user's hand, a user's face, a user's torso, etc.). Portions of the binary image that are detected as having a relatively high difference (e.g., have a difference value greater than the threshold) may be identified as motion of an object in the consecutive frames. Because the ceiling is static, any motion detected in consecutive frames is identified as the user. FIG. 12, discussed below, describes an example of detecting one or more users using a binary image.

Figure 9:
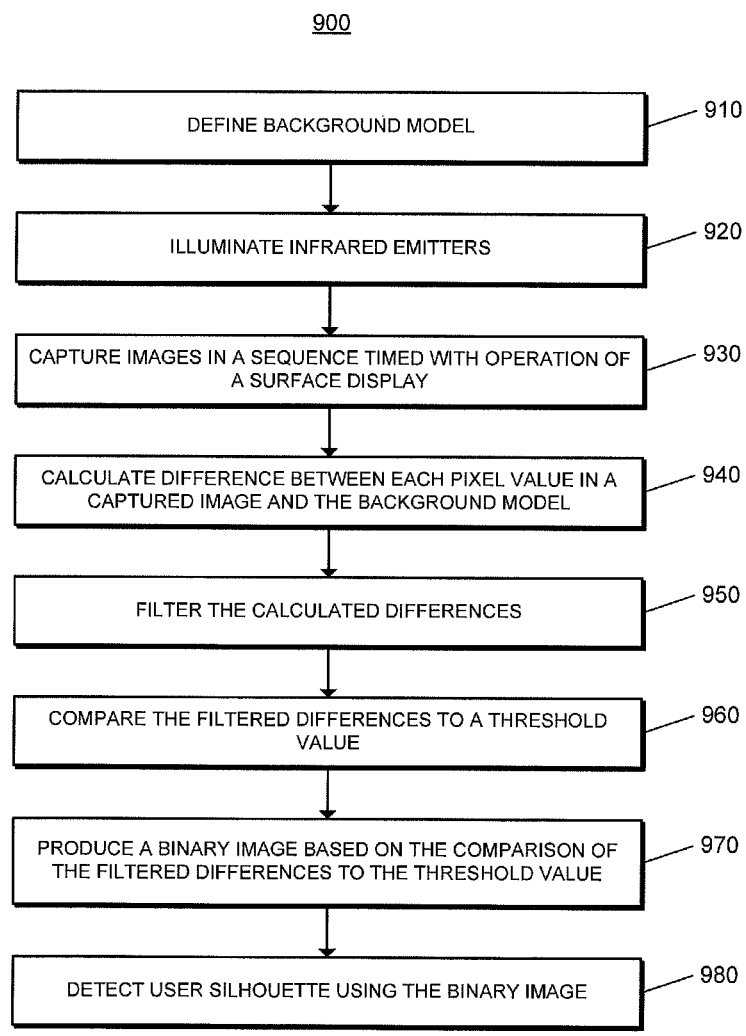

FIG. 9 illustrates an example process 900 for detecting a user. The process 900 may be performed by, or in association with, the electronic device 102 of FIGS. 1a and 1b, the tabletop computing system 200 of FIGS. 2a-2c and 3a and 3b, the electronic device of FIG. 4, the system shown in FIG. 6, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for detecting a user. In some implementations, the processor(s) may communicate and cooperate with (or otherwise control) various other associated hardware in order to perform the process for detecting a user.

Initially, a background model is defined (910). In some implementations, the system may generate a background model based on images taken by one or more cameras during a time at which only stationary or permanent background elements are present within the field of view of the one or more cameras. In these implementations, the background model may be configured such that an object in an image may be detected based on a comparison between the image and the background model. In some examples, the background model may be static and generated based on images taken prior to images taken for controlling a surface table. In other examples, the background model may be dynamic and generated based on images taken prior to and/or concurrent with images taken for controlling a surface table. A set of multiple images may be captured over a period time and, for each pixel location in the set of images, the most typical value may be selected as the background model.

In some implementations, infrared emitters are illuminated (920) and images are captured in a sequence timed with operation of a surface display (930). For instance, as described above, infrared emitters may be illuminated and images may be captured when the surface display is in a transparent state. In other implementations, infrared emitters may not be used.

A difference between each pixel value in a captured image and the background model is calculated (940) and the calculated differences are filtered (950). For example, a difference (e.g., absolute difference) between corresponding pixels in a captured image and the background model may be computed and the computed differences may be used to detect an object in the captured image. The filtering operation may be an averaging kernel. In one implementation of the filtering operation, for each pixel, the sum may be calculated for all the pixels within a neighborhood centered on that pixel. In this implementation, the operation may have the following effects. A pixel's difference may be strengthened or weakened by its neighboring pixels. Isolated pixels with large difference values may be suppressed. Also, clusters of pixels having relatively small difference values may be re-enforced, and the shape of clusters may be smoothed.

In some examples, the filtered differences are compared to a threshold value (960) and a binary image is produced based on the comparison of the filtered differences to the threshold value (970). For example, the system accesses a threshold value and compares the filtered differences to the accessed threshold value. In this example, the result of the comparison is written to a binary image that corresponds to pixels in the image. When the comparison reveals that a filtered difference for a pixel is greater than the accessed threshold value, a one may be written to the binary image and, when the comparison reveals that a filtered difference for a pixel is less than the accessed threshold value, a zero may be written to the binary image.

A user silhouette is detected using the binary image (980). For example, the binary image is analyzed to detect portions within the binary image that likely correspond to a body part of a user (e.g., a user's arm, a user's hand, a user's face, a user's torso, etc.). Portions of the binary image that are detected as having a relatively high difference with respect to the background model (e.g., have a difference value greater than the threshold) may be identified as a user in a captured image. Because the background is static, any difference from the background is identified as the user. FIG. 12, discussed below, describes an example of detecting one or more users using a binary image.

Figure 10:
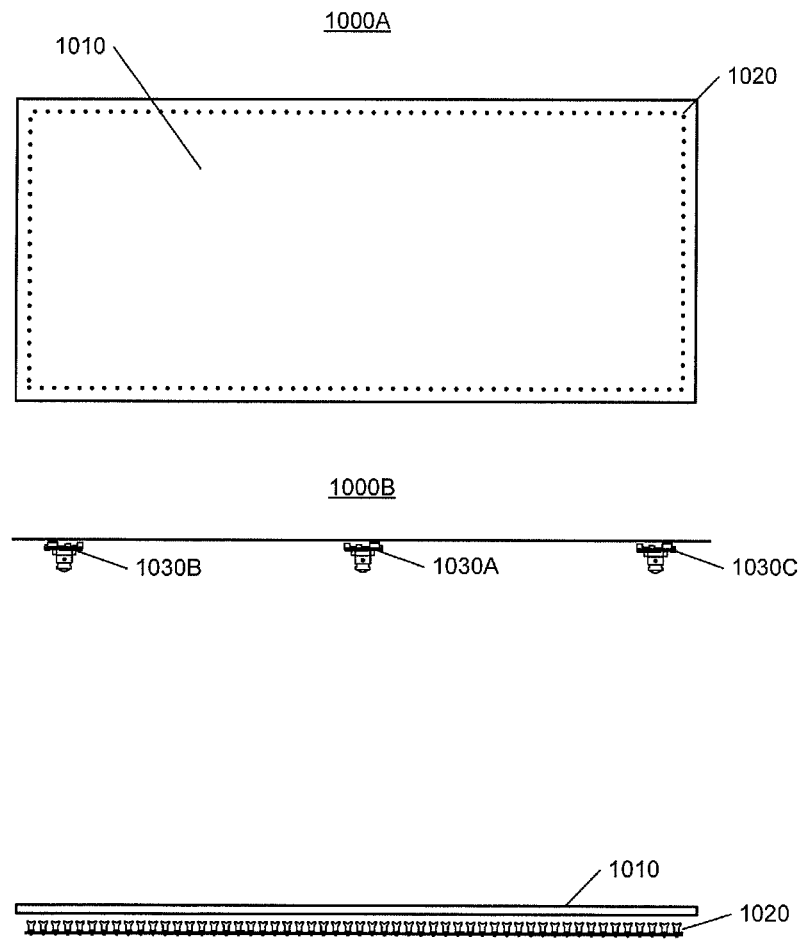

FIG. 10 illustrates an example system that includes cameras positioned on a ceiling above a surface computing table. FIG. 10 illustrates an overhead or top view 1000A of the example system and a side view 1000B of the example system. The system includes a table surface 1010, multiple infrared emitters 1020 positioned under the table surface 1010, and multiple cameras 1030A-1030D positioned on a ceiling directly above the table surface 1010. The multiple infrared emitters 1020 (or an LCD backlight) may backlight the table's surface such that the user's arm reaching over the table produces a dark silhouette against a bright background. The dark silhouette may be detected as the user. The table surface 1010 may be similar to the table surface 610 described above with respect to FIG. 6, the multiple infrared emitters 1020 may be similar to the multiple infrared emitters 620 described above with respect to FIG. 6, and the multiple cameras 1030A-1030D may be similar to the multiple cameras 630A-630D described above with respect to FIG. 6. The number and arrangement of the multiple infrared emitters 1020 and the multiple cameras 1030A-1030D are exemplary and other numbers and arrangements may be used.

Figure 11:
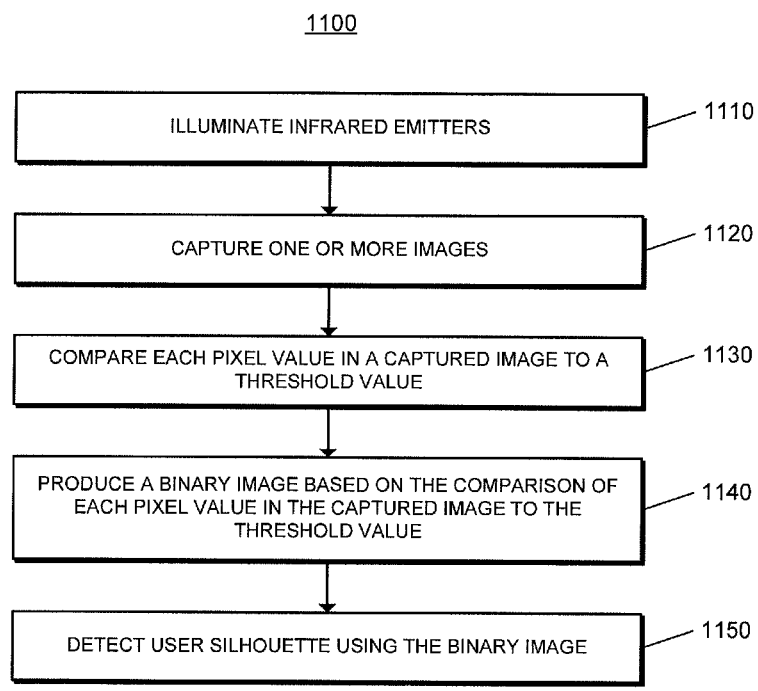

FIG. 11 illustrates an example process 1100 for detecting a user. The process 1100 may be performed by, or in association with, the electronic device 102 of FIGS. 1a and 1b, the tabletop computing system 200 of FIGS. 2a-2c and 3a and 3b, the electronic device of FIG. 4, the system shown in FIG. 10, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for detecting a user. In some implementations, the processor(s) may communicate and cooperate with (or otherwise control) various other associated hardware in order to perform the process for detecting a user.

Initially, infrared emitters are illuminated (1110) and one or more images are captured (1120). For instance, infrared emitters may be illuminated and images may be captured when the surface display is in a transparent state. The infrared light produced by the infrared emitters is blocked by the user's arm over the surface display. This may enhance ability to detect the user's arm in an image because the user's arm likely will appear darker than the surface display.

In some implementations, each pixel value in a captured image is compared to a threshold value (1130) and a binary image is produced based on the comparison of each pixel value in the captured image to the threshold value (1140). For example, the system accesses a threshold value and compares each pixel value to the accessed threshold value. In this example, the result of the comparison is written to a binary image that corresponds to pixels in the image. When the comparison reveals that the pixel value is less than the accessed threshold value, a one may be written to the binary image and, when the comparison reveals that the pixel value is greater than the accessed threshold value, a zero may be written to the binary image.

A user silhouette is detected using the binary image (1150). For instance, the binary image is analyzed to detect portions within the binary image that likely correspond to a body part of a user (e.g., a user's arm, a user's hand, a user's face, a user's torso, etc.). Portions of the binary image that are detected as being relatively dark (e.g., have a value less than the threshold) may be identified as a portion of a user. FIG. 12, discussed below, describes an example of detecting one or more users using a binary image.

FIG. 12 illustrates an example process 1200 for controlling orientation of displayed element(s) based on detected user positions. The process 1200 may be performed by, or in association with, the electronic device 102 of FIGS. 1a and 1b, the tabletop computing system 200 of FIGS. 2a-2c and 3a and 3b, the electronic device of FIG. 4, the system shown in FIG. 6, the system shown in FIG. 10, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for controlling orientation of displayed element(s) based on detected user positions. In some implementations, the processor(s) may communicate and cooperate with (or otherwise control) various other associated hardware in order to perform the process for controlling orientation of displayed element(s) based on detected user positions.

Initially, a relevant region in a camera's field of view is defined (1210) and pixels that are in the binary image and within the defined region are clustered (1220). For instance, the relevant region in the camera's field of view is defined as the part of the camera image that corresponds to the transparent portion of the table while excluding the part of the camera image that corresponds to the table's frame. Pixels may be clustered by grouping the pixels in the binary image into regions that all have the same value.

In some implementations, clustered pixels are analyzed to detect user arm position (1230) and clustered pixels are analyzed to detect user hand position (1240). For instance, the system may compare shapes of clustered pixels to shapes of a user's arm and/or hand and detect a user's arm and/or hand based on the comparison. A user's arm (when reaching towards an on-screen display element) may appear as a long thin cluster of pixels, which may appear as a long thin extension to from a user's torso when the user's upper torso and head are detected. The system may detect long thin clusters of pixels as an arm.

The end of the arm cluster that is furthest from an edge of the perimeter of the surface table may be detected as the user's hand. The hand position may be calculated and remapped from camera coordinates to screen coordinates to determine the position of the hand relative to display elements. If the hand position is within or near to the bounds of an on-screen element, the system may determine that the user's hand is either hovering over or touching the element and that on-screen element may be selected for re-orientation towards the user.

In implementations in which the user's upper torso and head are not detected, one end of the arm's long thin cluster will touch or be near the edge of the perimeter of the surface table. The end of the arm cluster nearest the edge of the perimeter of the surface table will typically be the user's upper arm or elbow. The position of this end may be used to infer the position of the user. For instance, the center of the user may be slightly to one side or the other (depending on whether the user is reaching with his left or right arm). If it is known (or determined by the shape of the arm), an exact position of the user's body may be estimated and used in determining the orientation in which to rotate an on-screen display element so that it is aligned with the user. Otherwise, an on-screen element may be oriented to be perpendicular to the edge of the perimeter of the surface table that detected arm intersects. On a rectangular table, the on-screen element may be oriented to one of four directions.

In some examples, the infrared emitters may be placed near the edges of the table to direct light upwards but not outwards, so that the user's upper torso and head are not illuminated. This may be advantageous for arm detection because it allows the user's arm to be more easily segmented.

Also, clustered pixels may be analyzed to detect user torso/head position (1250). Whether or not the system detects the user's upper torso and head depends on the camera's field of view, infrared illumination, and processing. The system may detect a user's upper torso and head by identifying a cluster near an edge of the perimeter of the surface table. The position of the cluster is used to determine a user's position and used in determining the orientation in which to rotate an on-screen display element so that it is aligned with the user.

In some examples, at least some infrared emitters may be directed outwards from the surface table to illuminate a user's torso and head. This may be advantageous for detecting user torso/head position.

Orientation of one or more displayed elements is controlled based on the detected positions (1260). For instance, a displayed element may be oriented toward a detected head of a user nearest the displayed element. Any of the techniques described throughout this disclosure for controlling orientation of one or more displayed elements may be used.

Figure 13:
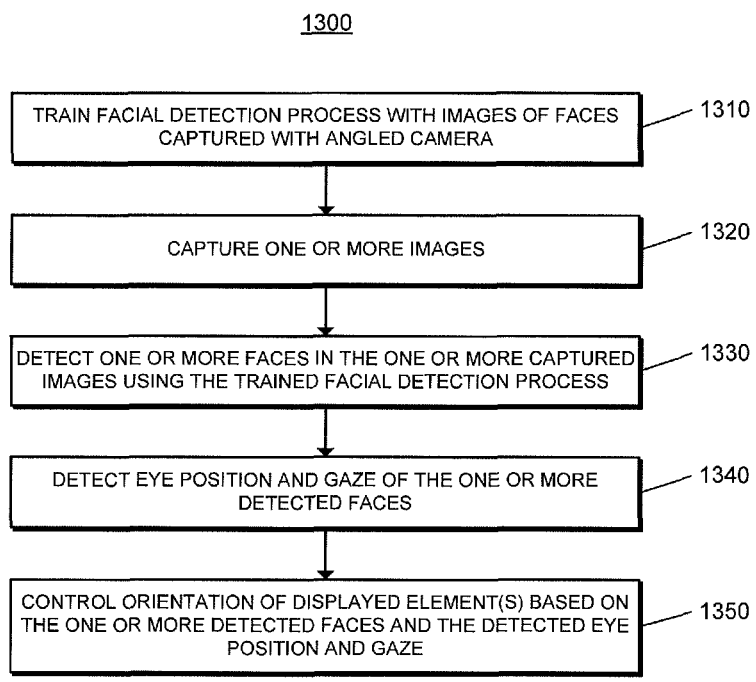

FIG. 13 illustrates an example process 1300 for controlling orientation of displayed element(s) based on detected facial features. The process 1300 may be performed by, or in association with, the electronic device 102 of FIGS. 1a and 1b, the tabletop computing system 200 of FIGS. 2a-2c and 3a and 3b, the electronic device of FIG. 4, the system shown in FIG. 6, the system shown in FIG. 10, or any other touch-screen display or any other electronic device having a touch-screen display. For example, any of these devices may include one or more processors and a storage component that is accessible by the processor(s) and that stores software (e.g., instructions) that, when executed by the processor(s), causes the processor(s) to perform the process for controlling orientation of displayed element(s) based on detected user positions. In some implementations, the processor(s) may communicate and cooperate with (or otherwise control) various other associated hardware in order to perform the process for controlling orientation of displayed element(s) based on detected facial features.

Initially, a facial detection process is trained for images of faces captured with an angled camera (1310). For instance, a set of images of faces taken from a downward angle may be used to train the facial detection process because the view of a face of a user operating a surface table is not straight-on. The facial detection process may include a Viola/Jones face detection process or an AdaBoost process and Harr-like features.

In some implementations, one or more images are captured (1320) and one or more faces are detected in the one or more captured images using the trained facial detection process (1330). In examples in which a Viola/Jones face detection process is used, faces are detected that are close to a known orientation within the camera image. For a rectangular table, four face detection regions may be defined, with each region covering an edge of the table (the regions may overlap near the table's corners). Each region is searched for the orientation of a face corresponding to a person sitting on that side of the table and faces are detected based on the searching.

In examples in which an AdaBoost process and Harr-like features are used, faces are detected at any orientation because the process is rotationally invariant. Accordingly, these examples may be used for round or oddly shaped tables.

Also, eye position and gaze of the one or more detected faces is detected (1340). For instance, detected faces may be analyzed to identify an eye position within the detected face and also a direction in which a detected eye is looking (e.g., a gaze direction). The eye position and gaze direction may be used in determining which displayed element the user is currently focused on.

Orientation of one or more displayed elements is controlled based on the one or more detected faces and the detected eye position and gaze (1350). For example, the position of detected faces may be used to determine the orientation in which to re-orient an on-screen element. The determined orientation may be an orientation that aligns the on-screen element with the detected face. A user's eyes and gaze also may be used to identify which on-screen element a user is looking at and the identified element may be re-oriented to be aligned with the user's gaze. Any of the techniques described throughout this disclosure for controlling orientation of one or more displayed elements may be used.

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computer-readable storage media or devices (e.g., CD-ROM, RAM, or magnetic disk). When read into a processor of a computer and executed, the instructions of the programs may cause a programmable computer to carry out the various operations described above.

A number of implementations have been described. Nevertheless, it will be understood that various modifications and implementations may be made. For example, in some implementations, before an element is displayed on a touch-screen display device, one or more captured images of a user of the touch-screen display device may be processed to determine the orientation of the user relative to the touch-screen display and the element thereafter may be displayed on the touch-screen display device with an initial orientation that is influenced by the determined orientation of the user relative to the touch-screen display. Additionally or alternatively, some implementations may allow users to manually control the orientation of displayed elements in addition to (or as an alternative to) automatically adjusting the orientation of the displayed elements. Also, as described above, some implementations may use cameras to capture images of users for the purpose of detecting that a user is interacting with a displayed element and for the purpose of determining a user's orientation relative to the display (or a displayed element). In such implementations, the same or different cameras may be used to capture images of the user for the purpose of detecting that a user is interacting with a displayed element and for the purpose of determining a user's orientation. In addition, the same or different images may be processed to detect if a user is interacting with a displayed element and for determining a user's orientation. Furthermore, the disclosed systems and techniques generally may be applicable to all types of displays, not just touch-screen displays.

In some cases, components and other features disclosed above may be described as being configured in a certain manner. It will be appreciated that such components also may be described as being constructed, adapted, built, arranged, and/or assembled in a certain manner.

In addition, useful results also may be achieved if steps of the disclosed techniques are performed in a different order and/or if components in the disclosed systems are combined in a different manner and/or replaced or supplemented by other components.

What is claimed is:

1. A method for automatically adjusting orientations of elements displayed on an interactive touch-screen display device, the method comprising:
    initially displaying a plurality of elements on the interactive touch-screen display device, each of the plurality of elements being in an initial orientation relative to the interactive touch-screen display device;
    capturing one or more images of a user of the interactive touch-screen display device;
    analyzing the one or more images of the user to:
        detect an eye of the user, and
        determine a direction in which the detected eye is looking;
    determining that the user is interacting with a certain element of the plurality of elements displayed on the interactive touch-screen display device based, at least in part, on the direction in which the detected eye is looking;
    determining an orientation of the user relative to the interactive touch-screen display device based on at least one captured image of the user of the interactive touch-screen display device; and
    in response to determining that the user is interacting with the certain element, automatically adjusting the initial orientation of the certain element relative to the interactive touch-screen display device based on the determined orientation of the user relative to the interactive touch-screen display device.

2. The method of claim 1 wherein:
    capturing one or more images of the user of the interactive touch-screen display device includes capturing one or more images of the user that include at least a portion of the user's arm after determining that the user is interacting with the certain element; and
    determining the orientation of the user relative to the interactive touch-screen display device includes:
        determining an orientation of the user's arm relative to the at least one captured image of the user that includes the portion of the user's arm, and
        determining the orientation of the user relative to the interactive touch-screen display device based on the determined orientation of the user's arm relative to the at least one captured image of the user that includes the portion of the user's arm.

3. The method of claim 1 wherein:
    capturing one or more images of the user of the interactive touch-screen display device includes capturing one or more images of the user that include at least a portion of the user's face after determining that the user is interacting with the certain element; and
    determining the orientation of the user relative to the interactive touch-screen display device includes:
        determining an orientation of at least one facial feature of the user relative to the at least one captured image of the user that includes the portion of the user's face, and
        determining the orientation of the user relative to the interactive touch-screen display device based on the determined orientation of the at least one facial feature of the user relative to the at least one captured image of the user that includes the portion of the user's face.

4. The method of claim 1 wherein:
    capturing one or more images of the user of the interactive touch-screen display device includes capturing one or more images of the user that include at least a portion of the user's head after determining that the user is interacting with the certain element; and
    determining the orientation of the user relative to the interactive touch-screen display device includes:
        determining an orientation of the user's head relative to the at least one captured image of the user that includes the portion of the user's head, and
        determining the orientation of the user relative to the interactive touch-screen display device based on the determined orientation of the user's head relative to the at least one captured image of the user that includes the portion of the user's head.

5. The method of claim 1 wherein:
    capturing one or more images of the user of the interactive touch-screen display device includes capturing one or more images of the user that include at least a portion of the user's body after determining that the user is interacting with the certain element; and
    determining the orientation of the user relative to the interactive touch-screen display device includes:
        determining an orientation of the user's body relative to the at least one captured image of the user that includes the portion of the user's body, and
        determining the orientation of the user relative to the interactive touch-screen display device based on the determined orientation of the user's body relative to the at least one captured image of the user that includes the portion of the user's body.

6. The method of claim 1 wherein:
    determining that the user is interacting with the certain element of the plurality of elements displayed on the interactive touch-screen display device further includes determining that the user moved the certain element from a first location on the interactive touch-screen display device to a second location on the interactive touch-screen display device; and
    automatically adjusting the initial orientation of the certain element relative to the interactive touch-screen display device includes automatically adjusting the initial orientation of the certain element relative to the interactive touch-screen display device based on the determined orientation of the user relative to the interactive touch-screen display device as well as the second location on the interactive touch-screen display device.

7. The method of claim 1 wherein:
the certain element has a top and a bottom; and
automatically adjusting the initial orientation of the certain element relative to the interactive touch-screen display device includes automatically adjusting the initial orientation of the certain element such that after adjusting the initial orientation of the certain element the top of the certain element is above the bottom of the certain element within a field of vision of the user.

8. The method of claim 1 further comprising:
initially displaying another element of the plurality of elements on the interactive touch-Screen display device with an initial orientation relative to the interactive touch-screen display device;
capturing one or more images of another user of the interactive touch-screen display device;
determining that the other user is interacting with the other element displayed on the interactive touch-screen display device;
determining an orientation of the other user relative to the interactive touch-screen display device based on at least one captured image of the other user of the interactive touch-screen display device; and
in response to determining that the other user is interacting with the other displayed element, automatically adjusting the initial orientation of the other displayed element relative to the interactive touch-screen display device based on the determined orientation of the other user relative to the interactive touch-screen display device.

9. The method of claim 1 wherein determining that the user is interacting with the certain element of the plurality of elements displayed on the interactive touch-screen display device further includes determining that the user is gesturing in the vicinity of the certain element displayed on the interactive touch-screen display device based on at least one captured image of the user of the interactive touch-screen display device.

10. The method of claim 1 wherein:
determining an orientation of the user relative to the interactive touch-screen display device includes determining, while the user is interacting with the certain element of the plurality of elements displayed on the interactive touch-screen display device, that the orientation of the user relative to the interactive touch-screen display device has changed from a first orientation of the user relative to the interactive touch-screen display device to a second orientation of the user relative to the interactive touch-screen display device; and
automatically adjusting the initial orientation of the certain element relative to the interactive touch-screen display device includes automatically adjusting the initial orientation of the certain element relative to the interactive touch-screen display device based on the second orientation of the user relative to the interactive touch-screen display device.

11. The method of claim 1 further comprising:
responsive to the user's interaction with the certain element of the plurality of elements displayed on the interactive touch-screen display device, displaying another element on the interactive touch-screen display device with an initial orientation relative to the interactive touch-screen display device, wherein the initial orientation of the other element relative to the interactive touch-screen display device is based on the determined orientation of the user relative to the interactive touch-screen display device.

12. The method of claim 1 wherein determining that the user is interacting with the element displayed on the interactive touch-screen display device further includes determining that the user is moving the element displayed on the interactive touch-screen display device toward the user.

13. The method of claim 1 wherein determining that the user is interacting with the certain element of the plurality of elements displayed on the interactive touch-screen display device further includes determining that the user is moving the certain element displayed on the interactive touch-screen display device away from the user.

14. The method of claim 1 further comprising:
determining that the user is moving the certain element displayed on the interactive touch-screen display device away from the user and toward another user of the interactive touch-screen display device;
capturing one or more images of the user of the interactive touch-screen display device;
determining an orientation of the other user relative to the interactive touch-screen display device based on at least one captured image of the other user of the interactive touch-screen display device; and
in response to determining that the user is moving the certain element displayed on the interactive touch-screen display device away from the user and toward the other user, automatically adjusting the orientation of the certain element relative to the interactive touch-screen display device based on the determined orientation of the other user relative to the interactive touch-screen display device.

15. The method of claim 1 wherein automatically adjusting the initial orientation of the certain element relative to the interactive touch-screen display device based on the determined orientation of the user relative to the interactive touch-screen display device includes maintaining the initial orientation of the certain element relative to the interactive touch-screen display device unchanged based on the determined orientation of the user relative to the interactive touch-screen display device.

16. The method of claim 1 wherein automatically adjusting the initial orientation of the certain element relative to the interactive touch-screen display device based on the determined orientation of the user relative to the interactive touch-screen display device includes changing the initial orientation of the certain element relative to the interactive touch-screen display device based on the determined orientation of the user relative to the interactive touch-screen display device.

17. A method for automatically adjusting orientations of elements displayed on an interactive touch-screen display device, the method comprising:
initially displaying a plurality of elements on the interactive touch-screen display device, each of the plurality of elements being in an initial orientation relative to the interactive touch-screen display device;
capturing one or more images of a user of the interactive touch-screen display device;
analyzing the one or more images of the user to:
detect an eye of the user, and
determine a direction in which the detected eye is looking;
determining that the user is interacting with a certain element of the plurality of elements displayed on the interactive touch-screen display device based, at least in part, on the direction in which the detected eye is looking;

determining an orientation of the user relative to the certain element based on at least one captured image of the user of the interactive touch-screen display device; and in response to determining that the user is interacting with the certain element, automatically adjusting the initial orientation of the certain element relative to the interactive touch-screen display device based on the determined orientation of the user relative to the certain element.

18. A system comprising:

an interactive touch-screen display device;

a camera configured to capture images of one or more users of the interactive touch-Screen display device; and a processing unit that is configured to:
- cause a display of a plurality of elements on the interactive touch-screen display device, each of the plurality of elements being in an initial orientation relative to the interactive touch-screen display device;
- analyze a captured image of a user to:
  - detect an eye of the user, and
  - determine a direction in which the detected eye is looking;
- determine that the user is interacting with a certain element of the plurality of elements displayed on the interactive touch-screen display device based, at least in part, on the direction in which the detected eye is looking;
- determine an orientation of the user relative to the interactive touch-screen display device based on at least one image of the user of the interactive touch-screen display device captured by the camera; and
- automatically adjust the initial orientation of the certain element relative to the interactive touch-screen display device based on the determined orientation of the user relative to the interactive touch-screen display device and in response to a determination that the user is interacting with the certain element.

19. An apparatus, comprising:

means for causing an interactive touch-screen display device to initially display a plurality of elements, each of the plurality of elements being in an initial orientation relative to the interactive touch-screen display device;

means for causing one or more images of a user of the interactive touch-screen display device to be captured;

means for analyzing the one or more images of the user to:
- detect an eye of the user, and
- determine a direction in which the detected eye is looking;

means for determining that the user is interacting with a certain element of the plurality of elements displayed on the interactive touch-screen display device based, at least in part, on the direction in which the detected eye is looking;

means for determining an orientation of the user relative to the interactive touch-screen display device based on at least one captured image of the user of the interactive touch-screen display device; and means for causing, in response to determining that the user is interacting with the certain element, the initial orientation of the certain element to be automatically adjusted relative to the interactive touch-screen display device based on the determined orientation of the user relative to the interactive touch-screen display device.

20. A computer-readable storage medium having stored thereon instructions that when executed by a computer cause the computer to:
- cause an interactive touch-screen display device to initially display a plurality of elements, each of the plurality of elements being in an initial orientation relative to the interactive touch-screen display device;
- cause one or more images of a user of the interactive touch-screen display device to be captured;
- analyze the one or more images of the user to:
  - detect an eye of the user, and
  - determine a direction in which the detected eye is looking;
- determine that the user is interacting with a certain element of the plurality of elements displayed on the interactive touch-screen display device based, at least in part, on the direction in which the detected eye is looking;
- determine an orientation of the user relative to the interactive touch-screen display device based on at least one captured image of the user of the interactive touch-screen display device; and
- in response to determining that the user is interacting with the certain element, automatically cause adjustment of the initial orientation of the certain element relative to the interactive touch-screen display device based on the determined orientation of the user relative to the interactive touch-screen display device.

* * * * *